US012155144B2

(12) United States Patent
Nagayama et al.

(10) Patent No.: US 12,155,144 B2
(45) Date of Patent: Nov. 26, 2024

(54) CONNECTOR FOR CONNECTING A BOX-SHAPED BODY OF A CASING OF A VEHICLE TRANSMISSION

(71) Applicant: YAZAKI CORPORATION, Tokyo (JP)

(72) Inventors: Masataka Nagayama, Makinohara (JP); Yuya Yamamoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 419 days.

(21) Appl. No.: 17/720,310

(22) Filed: Apr. 14, 2022

(65) Prior Publication Data

US 2022/0336991 A1 Oct. 20, 2022

(30) Foreign Application Priority Data

Apr. 14, 2021 (JP) ................................ 2021-068506

(51) Int. Cl.

*H01R 13/40* (2006.01)
*H01R 13/405* (2006.01)
*H01R 13/52* (2006.01)
*H01R 13/621* (2006.01)

(52) U.S. Cl.

CPC ....... *H01R 13/405* (2013.01); *H01R 13/5216* (2013.01); *H01R 13/621* (2013.01)

(58) Field of Classification Search

CPC . H01R 13/405; H01R 13/5216; H01R 13/621
USPC .......................................................... 439/157
See application file for complete search history.

(56) References Cited

U.S. PATENT DOCUMENTS 6,464,538 B2 * 10/2002 Miyazaki ........... H01R 13/6589 439/95
7,059,918 B2 * 6/2006 Matsumoto ........ H01R 13/5812 439/752
7,077,676 B2 * 7/2006 Matsumoto .......... H01R 13/521 439/271
7,530,843 B1 * 5/2009 Tesfay ................. H01R 13/521 439/587

(Continued)

FOREIGN PATENT DOCUMENTS

JP H11-3735 A 1/1999
JP 2010-257710 A 11/2010

(Continued)

*Primary Examiner* — Harshad C Patel

(74) *Attorney, Agent, or Firm* — KENEALY VAIDYA LLP

(57) ABSTRACT

A connector includes a resin housing to be assembled to a wall portion of a box-shaped body, a bus bar held by the housing and having a fastened portion that is disposed inside the wall portion and is to be connected to a terminal fitting by fastening using a bolt, and a nut held by the housing with a gap between the nut and the fastened portion, the gap allowing insertion of the terminal fitting and engaged with the bolt to fasten the fastened portion and the terminal fitting inserted into the gap together. In the bus bar, a recessed portion recessed such that the bus bar is cut off is provided inside the wall portion. The recessed is exposed to an outside of the housing without being covered with a resin constituting the housing.

6 Claims, 12 Drawing Sheets

(56) References Cited

U.S. PATENT DOCUMENTS

| | | | | |
|---|---|---|---|---|
| 8,128,431 | B2 * | 3/2012 | Kato | H01R 13/521 439/271 |
| 8,152,574 | B2 * | 4/2012 | Matsuoka | H01R 4/302 439/587 |
| 8,556,660 | B2 * | 10/2013 | Matsuoka | H01R 43/24 439/626 |
| 8,747,145 | B2 * | 6/2014 | Gossen | H01R 13/5812 439/460 |
| 8,790,135 | B2 * | 7/2014 | Maegawa | H01R 43/24 439/246 |
| 9,065,194 | B2 * | 6/2015 | Suzuki | H01R 11/12 |
| 9,228,605 | B2 * | 1/2016 | Takemura | H01R 4/301 |
| 9,287,639 | B2 * | 3/2016 | Kaneko | H01R 4/34 |
| 11,646,508 | B2 * | 5/2023 | Yamanashi | H01R 13/502 439/801 |
| 11,888,275 | B2 * | 1/2024 | Nagayama | H01R 13/50 |
| 2007/0207652 | A1 * | 9/2007 | Tsuruta | H01R 4/30 439/166 |
| 2009/0029594 | A1 * | 1/2009 | Matsuoka | H01R 13/5219 439/626 |
| 2010/0273362 | A1 | 10/2010 | Matsuoka | |
| 2011/0014822 | A1 * | 1/2011 | Kato | H01R 13/65912 439/733.1 |
| 2014/0370737 | A1 * | 12/2014 | Okayasu | H01R 13/4223 439/357 |
| 2015/0079855 | A1 * | 3/2015 | Takemura | F16B 41/002 439/813 |
| 2015/0311617 | A1 | 10/2015 | Tamaki et al. | |
| 2016/0172781 | A1 | 6/2016 | Nunner et al. | |
| 2018/0269624 | A1 * | 9/2018 | Iwabe | H01R 13/6215 |
| 2019/0305471 | A1 * | 10/2019 | Kawamura | H01R 13/5202 |
| 2020/0295497 | A1 | 9/2020 | Suzuki | |
| 2021/0057834 | A1 * | 2/2021 | Nagayama | H01R 4/70 |
| 2022/0021148 | A1 | 1/2022 | Kudo | |

FOREIGN PATENT DOCUMENTS

| | | | |
|---|---|---|---|
| JP | 2013-157256 | A | 8/2013 |
| JP | 2015-210840 | A | 11/2015 |
| JP | 2018-85228 | A | 5/2018 |
| JP | 2019-3816 | A | 1/2019 |
| JP | 2019-179616 | A | 10/2019 |
| WO | 2020/105385 | A1 | 5/2020 |

* cited by examiner

CONNECTOR FOR CONNECTING A BOX-SHAPED BODY OF A CASING OF A VEHICLE TRANSMISSION

CROSS-REFERENCE TO RELATED APPLICATIONS

This application is based on and claims priority under 35 USC 119 from Japanese Patent Application No. 2021-068506 filed on Apr. 14, 2021, the contents of which are incorporated herein by reference.

TECHNICAL FIELD

The present invention relates to a connector and a holding structure of an electric wire with a terminal.

BACKGROUND ART

In the related art, there has been proposed a connector that is attached to an outer wall of a box-shaped body in which a liquid such as lubricating oil is sealed, such as a transmission (for example, a CVT) for a vehicle or a motor, and that electrically connects devices and the like disposed inside and outside the outer wall. This type of connector is also called a relay connector, and is typically assembled to the outer wall of the box-shaped body by being inserted into a hole provided in the outer wall (see, for example, Patent Literature 1).

CITATION LIST

Patent Literature

Patent Literature 1: JP-2013-157256-A

The connector of the related art described above has a structure in which a conductive bus bar is held in a resin housing. The connector having such a structure is typically manufactured by injecting a molten resin into a mold so as to surround the bus bar disposed in the mold (that is, by insert molding). Due to such a manufacturing method, depending on a shape of the housing, a shape and an arrangement of the bus bar, and the like, the bus bar receives flow pressure of the molten resin flowing in the mold at the time of molding, and thus the bus bar may be unintentionally displaced (that is, positional deviation may occur) in the mold. Such a positional deviation of the bus bar may be a factor that hinders proper connection between a terminal or the like on a connection counterpart side and the bus bar when the manufactured connector is actually used, and thus it is desirable to suppress the positional deviation as much as possible.

SUMMARY OF INVENTION

An object of the present invention is to provide a connector excellent in positional accuracy of a bus bar.

In order to achieve the above object, a connector and a holding structure of terminal-equipped electric wire according to the present invention are characterized as follows.

A connector of the present invention includes a resin housing to be assembled to a wall portion of a box-shaped body that is an attachment target; and a bus bar including a body portion insert-molded and held in the housing and a fastened portion that is disposed on an inner side of the box-shaped body with respect to the wall portion and is to be connected to a terminal fitting by fastening using a bolt.

The body portion of the bus bar includes a portion at which an exposed portion that is exposed to an outside of the housing without being covered with a resin constituting the housing is to be provided on an inner side of the box-shaped body with respect to the wall portion.

Further, details of the present invention will be clarified by reading an aspect (hereinafter, referred to as an "embodiment") for implementing the invention to be described below with reference to the accompanying drawings.

BRIEF DESCRIPTION OF DRAWINGS

FIG. 4A is a perspective view thereof. FIG. 4B is a side view thereof, and FIG. 4C is a front view thereof.

FIG. 6A is a side view showing a state before the assembling, FIG. 6B is a side view showing a state after the assembling, and FIG. 6C is a front view showing a state after the assembling.

DESCRIPTION OF EMBODIMENTS

Embodiment

Hereinafter, a connector 1 according to an embodiment of the present invention and a holding structure of terminal-equipped electric wire including the connector 1 and a terminal-equipped electric wire 8 will be described with reference to the drawings.

Figure 1:
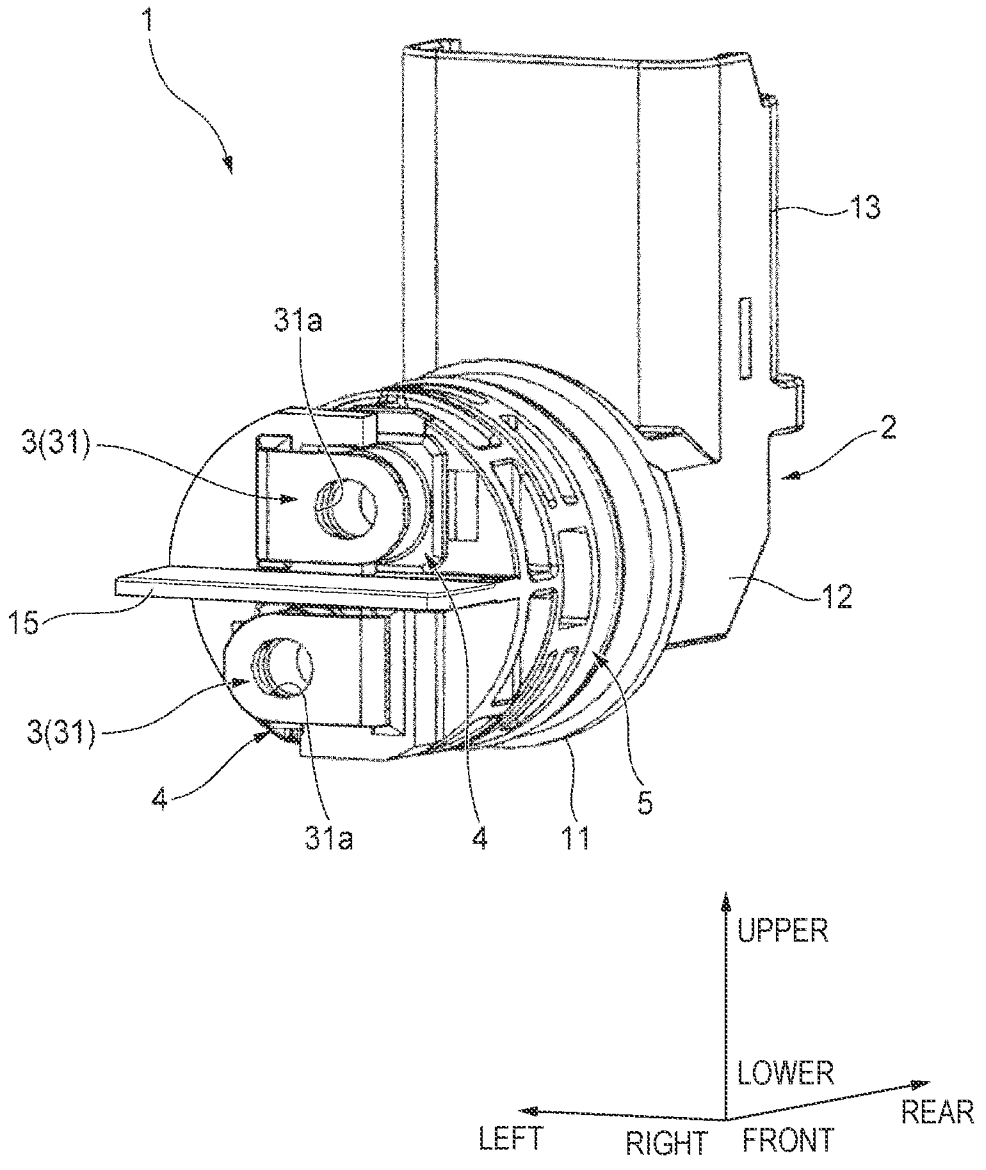
FIG. 1 is a perspective view showing a connector according to an embodiment of the present invention.
Figure 6A:
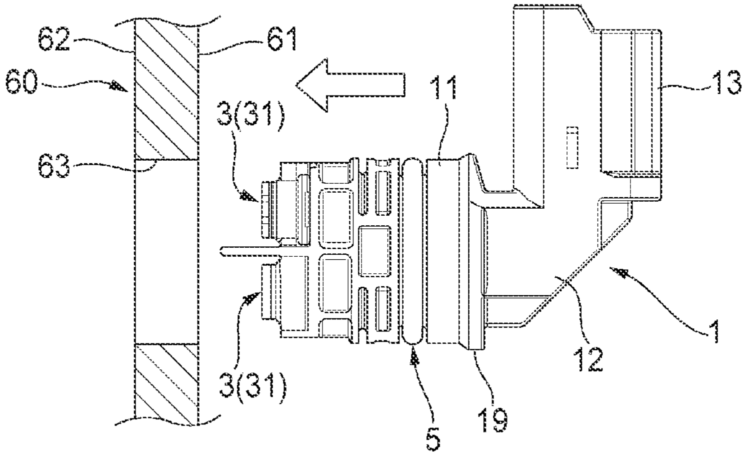
FIGS. 6A to 6C are views showing a procedure for assembling the connector to an outer wall of a case.
Figure 6B:
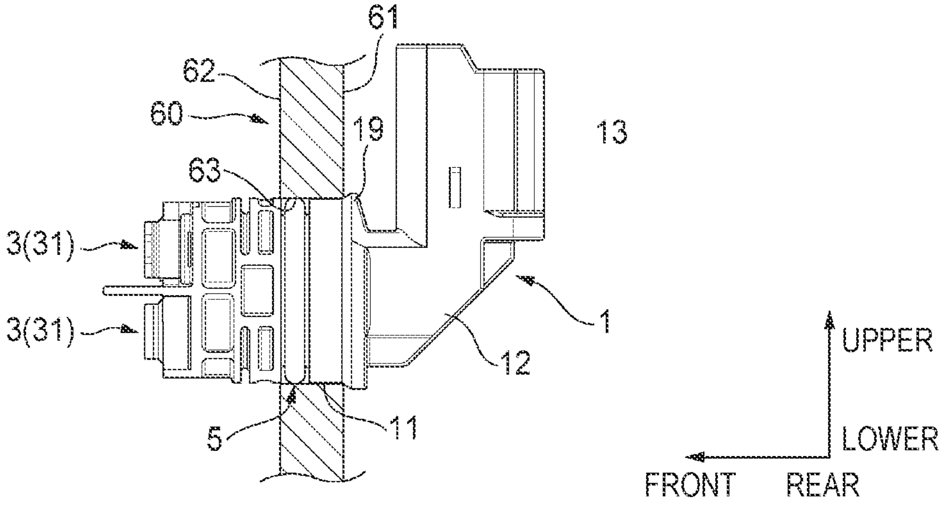
Figure 6C:
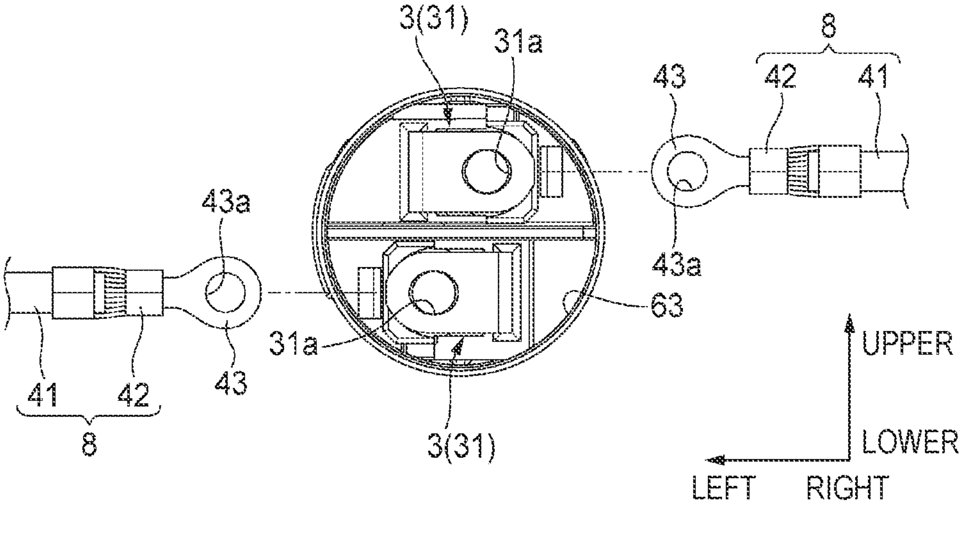

As shown in FIGS. 6A to 6C, the connector 1 shown in FIG. 1 is typically used in a state in which the connector 1 is attached to an outer wall 60 of a case (box-shaped body) such as a vehicle transmission (for example, a CVT), a distal end side portion of a main body portion 11 is exposed to oil (hydraulic oil or the like) in the case, and a connecting portion 12 and a connector portion 13 are exposed to air or water. An outer surface 61 of the outer wall 60 is exposed to air or water outside the case, and an inner surface 62 of the outer wall 60 is exposed to the oil stored in the case. The connector 1 functions as a relay connector that electrically connects a pair of terminal-equipped electric wires 8 (see FIG. 6C and the like) to be connected to fastened portions 31 of a pair of bus bars 3 exposed from a distal end surface of the main body portion 11 and a counterpart connector (not shown) to be fitted to the connector portion 13.

Hereinafter, for convenience of description, as shown in FIG. 1 and the like, a "front-rear direction", a "left-right direction", an "up-down direction", "front", "rear", "left", "right", "upper", and "lower" are defined. The "front-rear direction", the "left-right direction", and the "up-down direction" are orthogonal to one another. The up-down direction coincides with a fitting direction of the connector portion 13 and the counterpart connector. The left-right direction coincides with an extending direction of the pair of terminal-equipped electric wires 8 connected to the fastened portions 31 of the pair of bus bars 3 (see FIG. 6C).

As shown in FIG. 6C, the terminal-equipped electric wire 8 is configured by attaching a terminal fitting 42 to one end portion of an electric wire 41. The other end portion of the electric wire 41 is connected to a device (for example, an oil pump or the like and not shown) disposed inside the case. The metal terminal fitting 42 is a round terminal (so-called LA terminal) including a circular flat plate portion 43 in which a bolt through hole 43*a* is formed.

As shown in FIGS. 1 to 3B, the connector 1 includes a housing 2 and the pair of bus bars 3 insert-molded and held in the housing 2. Hereinafter, each member constituting the connector 1 will be described in order.

Figure 2A:
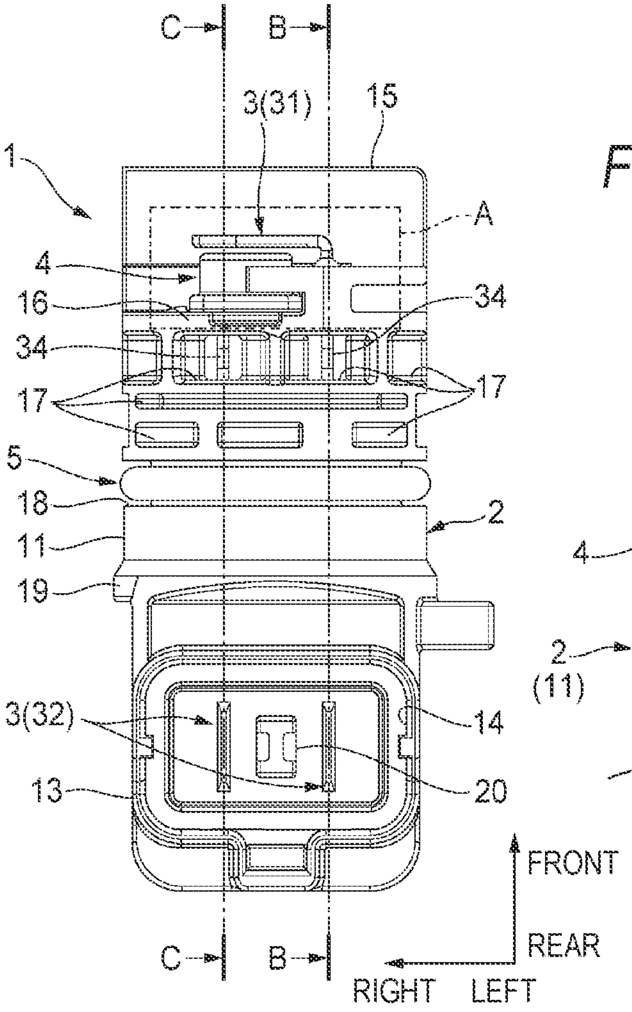
FIG. 2A is a top view of the connector shown in FIG. 1.

First, the housing 2 will be described. The housing 2 is a resin molded product, and as shown in FIGS. 1 to 3B, integrally includes the main body portion 11, the connecting portion 12 extending rearward from a rear end portion of the main body portion 11, and the connector portion 13 protruding upward from a rear end portion of the connecting portion 12. As shown in FIGS. 3A and 3B, a lower face of the connecting portion 12 extends in an oblique direction from a lower front side toward an upper rear side. The housing 2 has a substantially L shape when viewed in the left-right direction.

As shown in FIGS. 1 to 3B, the main body portion 11 has a substantially cylindrical shape extending in the front-rear direction. An outer diameter of the main body portion 11 (excluding an O-ring 5 and an annular protruding portion 19) is slightly smaller than an inner diameter of an attachment hole 63 of the outer wall 60 in order to be inserted into the attachment hole 63. Outer diameters of the O-ring 5 and the annular protruding portion 19 are larger than the inner diameter of the attachment hole 63. As shown in FIGS. 3A and 3B, substantially entire portions of the pair of bus bars 3 extending in the front-rear direction are embedded in the main body portion 11 and the connecting portion 12 by insert molding. The fastened portions 31 of the pair of bus bars 3 are exposed from a front end surface of the main body portion 11 so as to be disposed side by side at an interval in the up-down direction (see FIG. 1 and the like).

As shown in FIG. 1 and FIGS. 3A and 3B, the connector portion 13 has a substantially rectangular tubular shape extending in the up-down direction and extending in the left-right direction. As shown in FIGS. 3A and 3B, a substantially rectangular fitting recessed portion 14 recessed downward is formed inside the connector portion 13. A bottom surface of the fitting recessed portion 14 is formed by a part of an upper end surface of the connecting portion 12. Exposed portions 32, which will be described later, of the pair of bus bars 3 are exposed inside the fitting recessed portion 14 so as to be disposed side by side at an interval in the left-right direction (see also FIG. 2A). The counterpart connector described above is fitted into the fitting recessed portion 14. When the counterpart connector is fitted into the fitting recessed portion 14, the pair of exposed portions 32 are connected to a pair of terminals (not shown) accommodated in the counterpart connector. A guide projection 20 for guiding the counterpart connector at a time of fitting is provided between the pair of exposed portions 32 so as to extend in the up-down direction.

On the front end surface of the main body portion 11, a rectangular flat plate-shaped partition wall 15 protruding forward and extending in the left-right direction is integrally formed so as to partition the pair of fastened portions 31 in the up-down direction (see FIGS. 1, 3A, 3B, and the like). As shown in FIGS. 2A to 2C and 3A and 3B, nut holding portions 16 are formed on the front end surface of the main body portion 11 at an upper side and a lower side of the partition wall 15, respectively, so as to correspond to the pair of fastened portions 31. A metal nut 4 is fixed to each of the nut holding portions 16 so as to be non-rotatable and slightly movable in the front-rear direction.

In a state in which the connector 1 is assembled to the case (see FIG. 6B), the front end surface (that is, the pair of fastened portions 31) of the main body portion 11 is exposed to the oil stored in the case. By providing the partition wall 15, it is possible to increase an insulation distance (in particular, a creepage distance) between the fastened portion 31 of the upper bus bar 3 and the fastened portion 31 of the lower bus bar 3. Accordingly, even when conductive fine particles (for example, so-called contamination such as abrasion powder of gears) are contained in the oil, unintended conduction between the pair of bus bars 3 can be prevented.

Figure 2B:
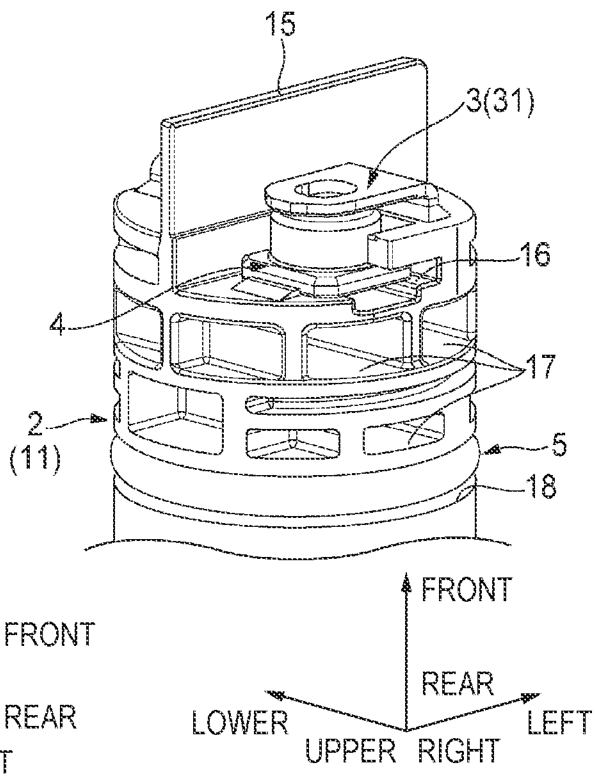
FIG. 2B is a perspective view showing a part of the connector shown in FIG. 1.
Figure 2C:
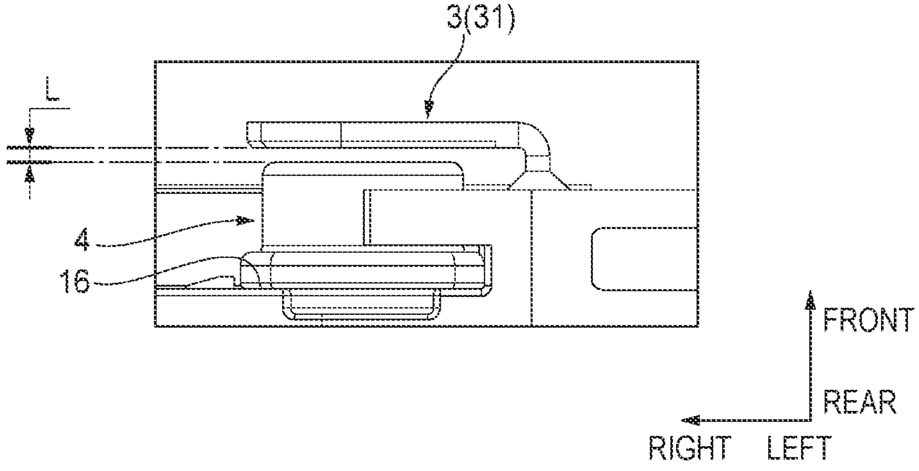
FIG. 2C is an enlarged view of a portion A of FIG. 2A.
Figure 3A:
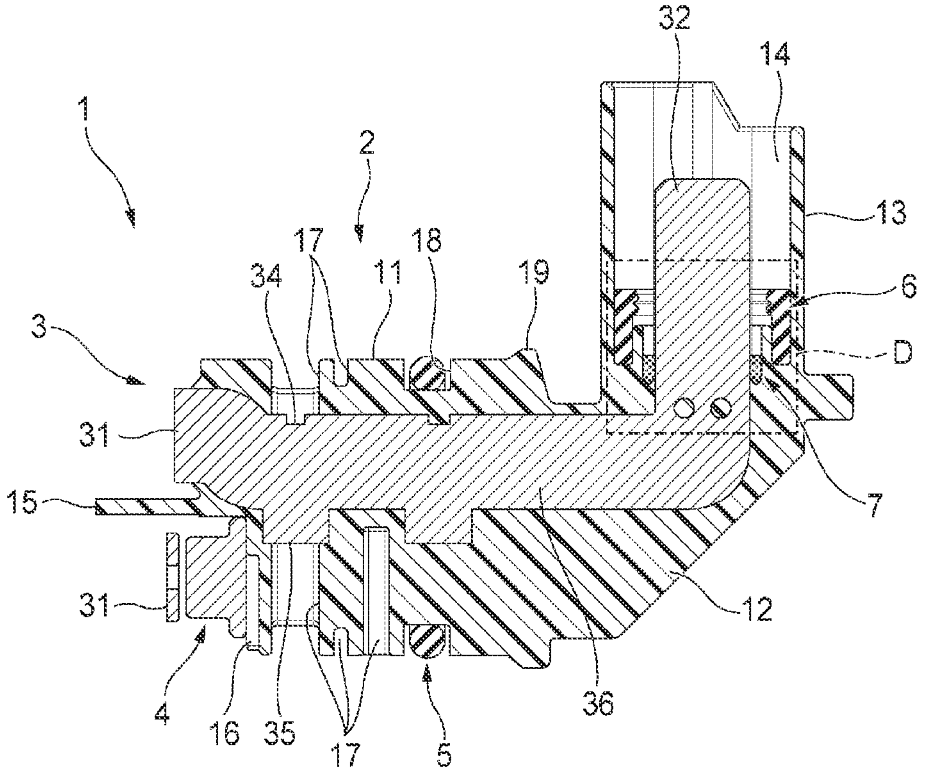
FIG. 3A is a cross-sectional view taken along a line B-B of FIG. 2A.
Figure 3B:
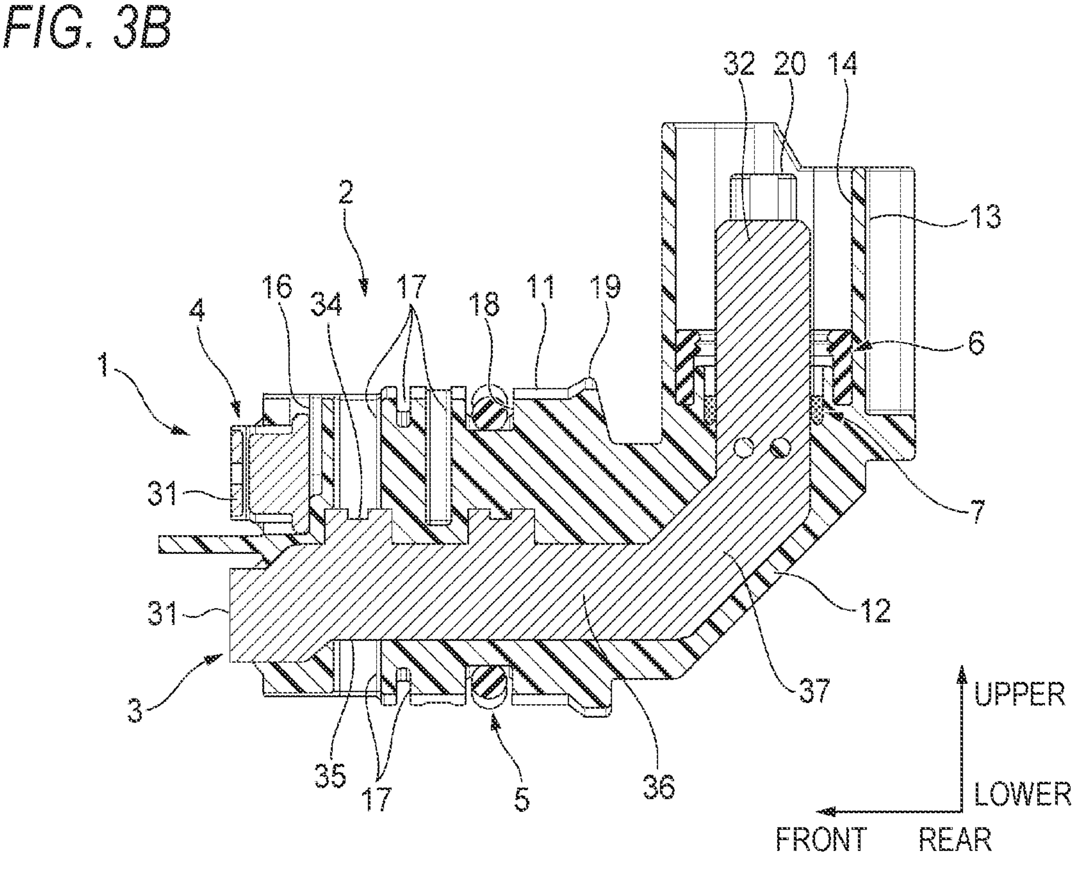
FIG. 3B is a cross-sectional view taken along a line C-C of FIG. 2A.

As shown in FIGS. 2B, 3A, 3B, and the like, a plurality of grooves 17 are formed in a cylindrical outer peripheral surface of a front portion of the main body portion 11. The grooves 17 are formed to reduce a thickness of the main body portion 11 of the housing 2 and to prevent a depression (so-called sinkage) or the like caused by molding shrinkage at a time of molding the housing 2 from occurring. In the present example, each of the grooves 17 has a shape that is recessed inward in a radial direction of the main body portion 11 and extends in a circumferential direction of the main body portion 11. By reducing the thickness of the main body portion 11 by the plurality of grooves 17, a variation in a dimension of the main body portion 11 itself due to the molding shrinkage of a resin constituting the main body portion 11 can be reduced, a positional accuracy of the bus bar 3 is improved, and a dimensional accuracy of a gap L (see FIG. 2C) to be described later between the fastened portion 31 and the nut 4 can be improved. In other words, the gap L can be prevented from being excessively large or excessively small.

As shown in FIGS. 3A, 3B, and the like, an annular recessed portion 18 is formed on a cylindrical outer peripheral surface of a rear portion of the main body portion 11. The rubber O-ring 5 is fitted into the annular recessed portion 18. The annular protruding portion 19 is formed at the rear end portion of the cylindrical outer peripheral surface of the main body portion 11 so as to protrude outward in the radial direction of the main body portion 11. The annular protruding portion 19 functions as a stopper that defines an insertion depth of the main body portion 11 when the main body portion 11 is inserted into the attachment hole 63 in the outer wall 60 of the case.

Figure 5A:
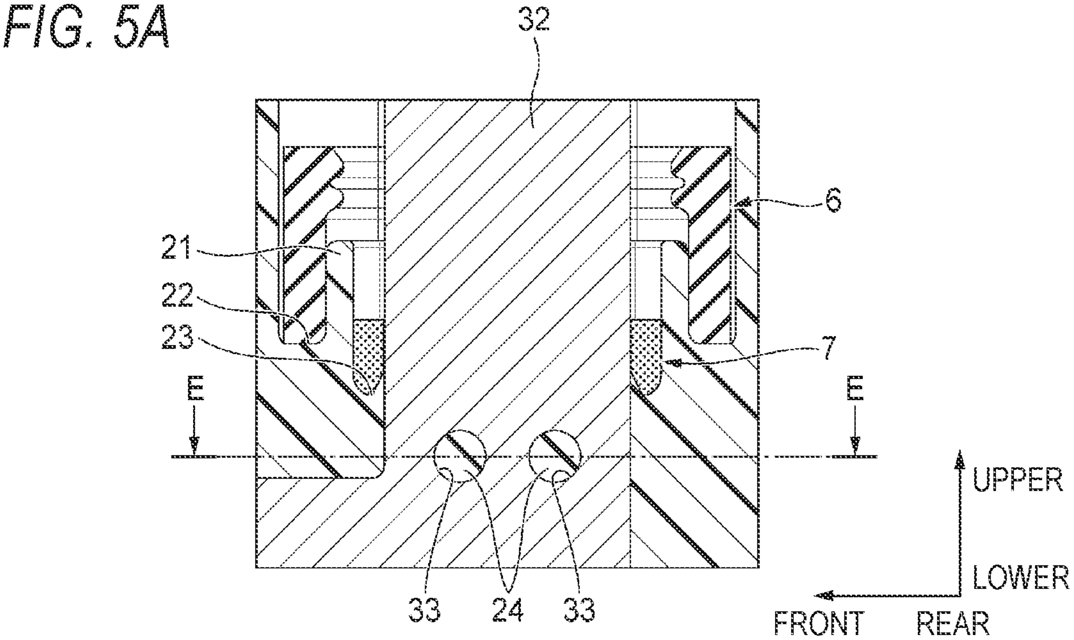
FIG. 5A is an enlarged view of a portion D in FIG. 3A.

As shown in FIG. 5A, a substantially rectangular cylindrical wall 21 protruding upward is formed on a bottom surface of the fitting recessed portion 14 of the connector portion 13 so as to face a substantially rectangular side face of the fitting recessed portion 14 (as viewed from above) with a gap therebetween. As a result, a substantially rectangular annular recessed portion 22 recessed downward is defined by the bottom surface and the side face of the fitting recessed portion 14 and the cylindrical wall 21. A rubber packing 6 is inserted into and fixed to the recessed portion 22. When the counterpart connector is fitted to the connector portion 13, the packing 6 exhibits a water-stop function of preventing water from entering through a fitting portion between the counterpart connector and the connector portion 13.

As shown in FIG. 5A, a recessed portion 23 recessed downward is formed on the bottom surface of the fitting recessed portion 14 of the connector portion 13 around a base portion (lower end portion) of the exposed portion 32 of each of the bus bars 3 in a region surrounded by the cylindrical wall 21. The recessed portion 23 is filled with a potting material 7 and cured. The potting material 7 exhibits a water-stop function of preventing water from entering through a boundary between the housing 2 and the bus bars 3. The housing 2 has been described.

Figure 4A:
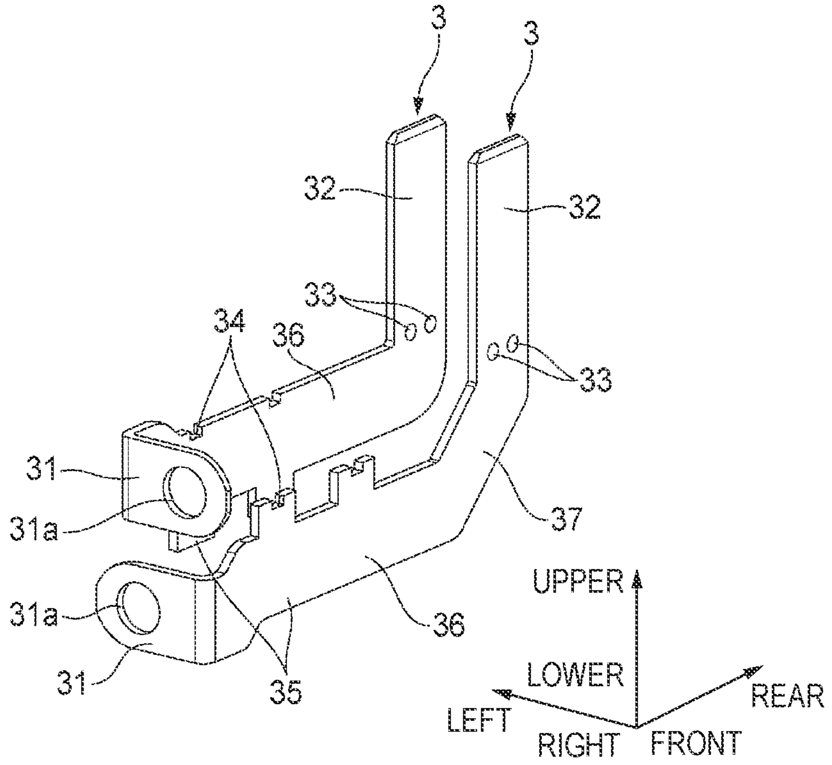
FIGS. 4A to 4C show a pair of bus bars shown in FIG. 1.

Next, the pair of bus bars 3 will be described. As can be understood from FIGS. 2 to 4B, the pair of bus bars 3 are held in the housing 2 by the insert molding so as to be spaced apart from each other in the left-right direction. As shown in FIG. 4A, the right bus bar 3 and the left bus bar 3 are common in that they have a substantially L shape as a whole when viewed in the left-right direction, and have different shapes from each other. Each of the bus bars 3 is formed by pressing and bending a metal plate. Of the pair of bus bars 3, one bus bar 3 functions as a positive side conductive portion, and the other bus bar 3 functions as a negative side conductive portion.

Figure 4B:
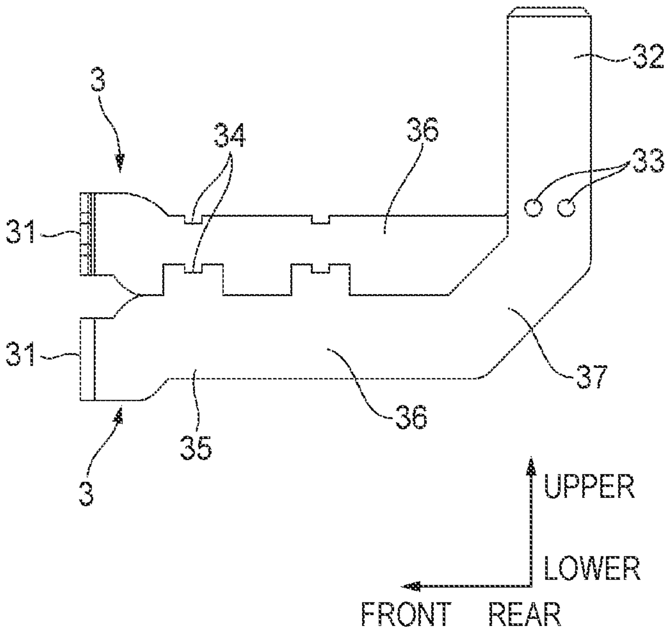

Except for the fastened portions 31, each of the bus bars 3 has a flat plate portion whose plate thickness direction is oriented in the left-right direction and having the substantially L shaped when viewed from the left-right direction. The flat plate portion has a shape corresponding to the above-described substantially L shape of the housing 2 when viewed in the left-right direction. More specifically, as shown in FIGS. 3A and 4A, the left bus bar 3 has the above-described substantially L shape by disposing and connecting a main body portion 36 embedded in the housing 2 and extending in the front-rear direction and the exposed portion 32 extending in the up-down direction so as to be substantially orthogonal to each other. Meanwhile, as shown in FIGS. 3B, 4A, and 4B, the right bus bar 3 includes the main body portion 36 embedded in the housing 2 and extending in the front-rear direction, the exposed portion 32 extending in the up-down direction, and a connecting portion 37 extending obliquely from a lower front side to an upper rear side. The right bus bar 3 has the above-described substantially L shape by disposing the main body portion 36 and the exposed portion 32 so as to substantially orthogonal to each other and connecting these two by the connecting portion 37. As shown in FIG. 3B, the connecting portion 37 extends along the lower face of the connecting portion 12 of the housing 2 at the substantially same inclination as the lower surface of the connecting portion 12. In other words, since the right bus bar 3 has the connecting portion 37 having such a shape, the lower face of the connecting portion 12 of the housing 2 can be formed into a shape inclined in an oblique direction. As shown in FIG. 3A, the left bus bar 3 is disposed at a position at which the left bus bar 3 does not interfere with the lower face of the connecting portion 12. As shown in FIG. 4B, the main body portion 36 of the left bus bar 3 and the main body portion 36 of the right bus bar 3 are offset from each other in the up-down direction due to the difference in the shapes of the right and left bus bars 3. As described above, since the left and right bus bars 3 have the above-described shapes, the lower face of the connecting portion 12 of the housing 2 can be inclined as described above, and a size of an outer shape of the housing 2 can be reduced.

Figure 4C:
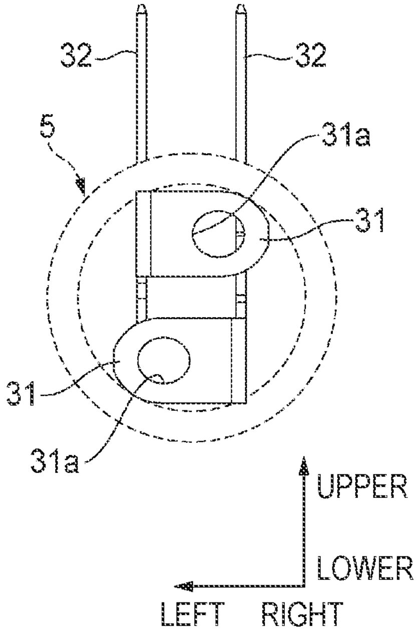

As shown in FIG. 4A, the fastened portion 31 of the left bus bar 3 is a flat plate-shaped portion that is bent from a front end portion of the main body portion 36 and extends rightward, and the fastened portion 31 of the right bus bar 3 is a flat plate-shaped portion that is bent from a front end portion of the main body portion 36 and extends leftward. Each of the fastened portions 31 is formed with a bolt through hole 31*a* penetrating in the plate thickness direction (that is, the front-rear direction). In this way, since the fastened portions 31 are bent from the front end portions of the main body portions 36 and extend in the left-right direction, a length of the bus bars 3 in the front-rear direction (eventually, a length of the connector 1) can be reduced as compared to a case in which the fastened portions 31 continuously extend forward from the front end portions of the main body portions 36. Further, the fastened portions 31 of the left and right bus bars 3 are disposed so as to be offset from each other in the up-down direction being different with each other. In this way, the fastened portions 31 of the left and right bus bars 3 are disposed so as to be offset from each other, whereby the interval between the left and right bus bars 3 (in particular, as shown in FIG. 4C, the main body portions 36 passing through an inside of the O-ring 5 indicated by broken lines) can be reduced. As a result, the pair of bus bars 3 can be rationally disposed in the outer diameter of the main body portion 11 (that is, in the O-ring 5) without excessively increasing the outer diameter of the main body portion 11 of the housing 2.

In each of the bus bars 3, a pair of through holes 33 are formed so as to be disposed in the front-rear direction at a position adjacent to a lower side of the base portion (lower end portion) of the exposed portion 32. In each of the bus bars 3, a recessed portion 34 recessed downward is formed at an upper edge of a portion adjacent to s rear side of the fastened portion 31. Hereinafter, for each of the bus bars 3, a lower edge corresponding to the recessed portion 34 (positioned directly below the recessed portion 34) at the position adjacent to the rear side of the fastened portion 31 is referred to as a "lower edge 35".

As shown in FIGS. 3A to 3C, in each of the bus bars 3, substantially the entire main body portion 36 is embedded in the main body portion 11 and the connecting portion 12 of the housing 2 by the insert molding. Meanwhile, the fastened portions 31, the exposed portions 32, the recessed portions 34, and the lower edges 35 of the bus bars 3 are exposed to an outside from the housing 2.

Specifically, as shown in FIG. 1 and the like, the fastened portion 31 of the left bus bar 3 is disposed so as to expose from the front end surface of the main body portion 11 on the upper side of the partition wall 15, extend rightward on a front side of the nut 4 positioned on the upper side of the partition wall 15, and cover the nut 4 (see FIG. 2C). Similarly, the fastened portion 31 of the right bus bar 3 is disposed so as to expose from the front end surface of the main body portion 11 on the lower side of the partition wall 15, extends leftward on a front side of the nut 4 positioned on the lower side of the partition wall 15, and covers the nut 4.

For each of the fastened portion 31 and the nut 4 positioned on the upper side of the partition wall 15 and the fastened portion 31 and the nut 4 positioned on the lower side of the partition wall 15, the gap L in the front-rear direction is provided between the fastened portion 31 and the nut 4 (see FIG. 2C), and the bolt through hole 31*a* of the fastened portion 31 and a female screw portion (not shown) of the nut 4 are coaxially disposed. The gap L is slightly larger than a plate thickness of the flat plate portion 43 of the terminal fitting 42 of the terminal-equipped electric wire 8. The terminal fitting 42 of the terminal-equipped electric wire 8 is connected to the fastened portion 31 by the flat plate portion 43 being inserted into the gap L and fastened and fixed to the fastened portion 31 (see FIGS. 6C and 7A to 7C).

In this way, the fastened portion 31 (of the left bus bar 3) positioned on the upper side of the partition wall 15 and the fastened portion 31 (of the right bus bar 3) positioned on the lower side of the partition wall 15 are disposed so as to extend in opposite directions to each other in the left-right direction, whereby, as shown in FIG. 4C, when viewed in the front-rear direction, substantially the entire pair of fastened portions 31 are positioned in a circular region inside the O-ring 5 mounted in the annular recessed portion 18 of the main body portion 11. Accordingly, when the main body portion 11 is inserted into the attachment hole 63, the pair of fastened portions 31 are prevented from interfering with a peripheral edge of the attachment hole 63 or the like. Further, when the O-ring 5 is externally inserted into the main body portion 11 from a front side of the main body portion 11 and is attached to the annular recessed portion 18, the pair of fastened portions 31 are less likely to become an obstacle.

As shown in FIG. 2A, the exposed portions 32 of the pair of bus bars 3 are disposed so as to be exposed inside the fitting recessed portion 14 of the connector portion 13, face each other at an interval in the left-right direction, and extend in the up-down direction. The pair of exposed portions 32 have the same shape.

As shown in FIGS. 3A and 3B, for each of the bus bars 3, the recessed portion 34 is exposed in one of the plurality of grooves 17 formed in the main body portion 11 of the housing 2 (see FIG. 2A), and the lower edge 35 is exposed in another one of the plurality of grooves 17. This configuration is implemented by, when the bus bars 3 are insert-molded in the housing 2, holding the recessed portions 34 and the lower edges 35 such that the recessed portions 34 and the lower edges 35 are vertically sandwiched between a pair of upper and lower inner surfaces of a molding die, and engaging a protrusion (not shown) formed on the upper inner surface of the molding die with the recessed portions 34. In this way, by engaging the protruding portion of the molding die with the recessed portions 34, even when the bus bars 3 receive flow pressure of a molten resin flowing in the die, a positional deviation of the bus bars 3 (in particular, in the front-rear direction) or the like is less likely to occur. As a result, the positional accuracy of the bus bars 3 with respect to the housing 2 can be improved, and the gaps L (see FIG. 2C) between the fastened portions 31 of the bus bars 3 and the nuts 4 can be prevented from being excessively large or excessively small. Therefore, it is possible to prevent insufficient temporary fixing of the terminal fittings 42, which will be described later, and weak co-fastening by a bolt 50, which will be described later, due to the gap L being too large. Further, it is possible to prevent a situation in which it is difficult to temporarily fix the terminal fitting 42 to the gaps L due to the gap L being too small.

Further, since the recessed portions 34 are exposed in the grooves 17, peripheral components can be prevented from being unintentionally caught by the recessed portion 34 when the connector 1 is used. Further, in the state in which the connector 1 is assembled to the case (see FIG. 6B), the grooves 17 (that is, the recessed portions 34) are positioned inside the case. In other words, the recessed portions 34 are provided in the bus bars 3 so as to be positioned inside the case when the connector 1 is used. Therefore, when the connector 1 is used, the recessed portions 34 are exposed to the oil stored in the case. In this regard, in the present example, portions of the bus bars 3 around the recessed portions 34 are surrounded by a groove inner wall of the grooves 17. Therefore, even when the conductive fine particles (for example, so-called contamination such as abrasion powder of gears) are contained in the oil, unintended conduction between the bus bars 3 and peripheral conductive component can be prevented. When the recessed portions 34 are positioned outside the case and exposed to outside air, foreign matter such as water may enter the inside of the case through a minute gap that may be generated between the resin constituting the housing 2 and the bus bars 3 (recessed portions 34). Also, in terms of avoiding such foreign matter intrusion, there is an advantage in that the recessed portions 34 are positioned inside the case.

Figure 5B:
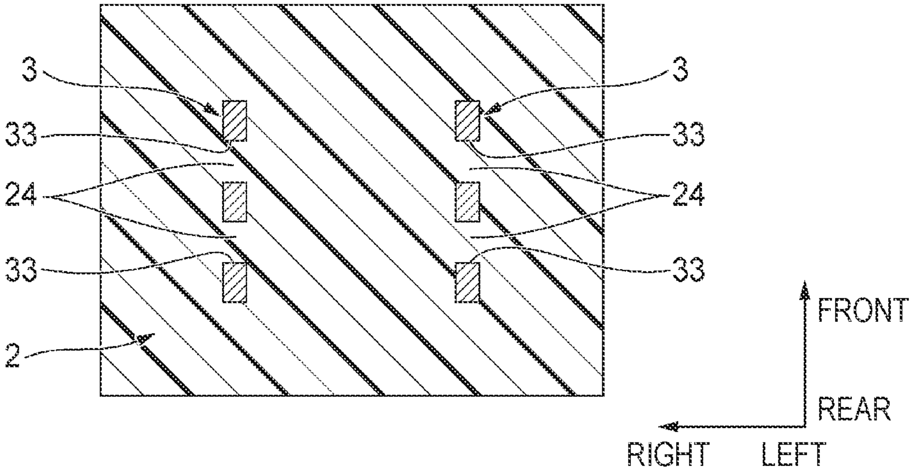
FIG. 5B is a cross-sectional view taken along a line E-E in FIG. 5A.
Figure 5C:
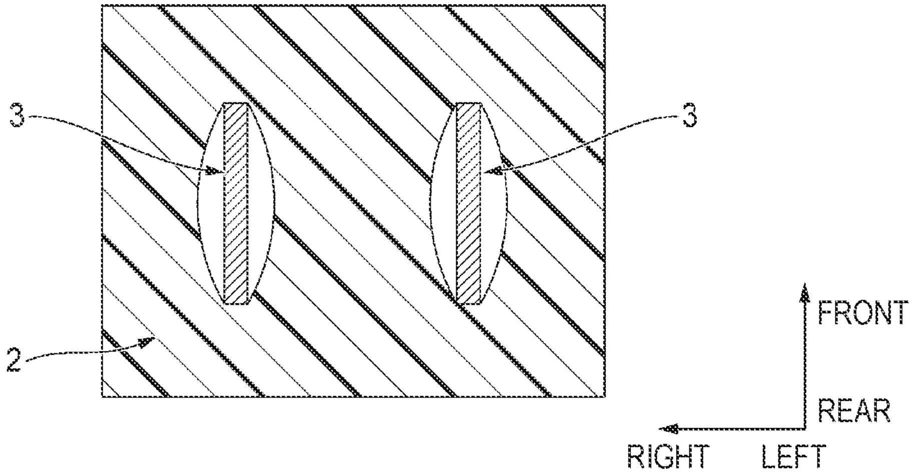
FIG. 5C is a view corresponding to FIG. 5B in a comparative example.

For each of the bus bars 3, a portion in which the pair of through holes 33 are formed is embedded in the housing 2 by the insert molding. Therefore, as shown in FIGS. 5A and 5B, the resin material also enters insides of the through holes 33, and thus bridge portions 24 that connects the resin material positioned in the vicinity of both left and right end edges of the through holes 33 are formed in the inside of the through holes 33. Therefore, at a time of molding the housing 2, the shrinkage (so-called sinkage) of the resin, which is recessed in a direction away from surfaces of the bus bars 3, is less likely to occur in the vicinity of the recessed portions 23 (see FIG. 5A) which are positioned in the periphery of the through holes 33 and are filled with the potting materials 7. Therefore, the potting materials 7 can be prevented from leaking out from the recessed portions 23 through the gap generated by the sinkage. When the through holes 33 are not formed in the bus bars 3, which is different from the present example, sinkage recessed in the direction away from the surfaces of the bus bars 3 as shown in FIG. 5C is likely to occur at the positions in the vicinity of the recessed portions 23 in the housing 2. This sinkage may cause the above-described leakage of the potting materials 7. The members of the connector 1 have been described above.

Next, a procedure for assembling the connector 1 to the outer wall 60 of the case and a procedure for assembling the pair of terminal-equipped electric wires 8 to the connector 1 will be described with reference to FIGS. 6A to 6C and 7A to 7C. First, the connector 1 is assembled to the outer wall 60 of the case. As shown in FIGS. 6A and 6B, the main body portion 11 of the housing 2 is inserted from the outer surface 61 side into the attachment hole 63 having a cylindrical inner peripheral surface and formed in the outer wall 60 of the case until the annular protruding portion 19 abuts against an edge portion of the attachment hole 63 on the outer surface 61 side, and the main body portion 11 and the outer wall 60 are locked to each other by a predetermined locking mechanism (not shown), whereby the assembly is achieved.

In a state in which the assembly of the connector 1 to the outer wall 60 of the case is completed (see FIG. 6B), a minute annular gap between the cylindrical outer peripheral surface of the main body portion 11 and the inner peripheral surface of the attachment hole 63 of the outer wall 60 is liquid-tightly and air-tightly sealed by the O-ring 5. As a result, the air and water positioned on the outer surface 61 side of the outer wall 60 of the case are separated from the oil positioned on the inner surface 62 side of the outer wall 60 of the case. The fastened portions 31 of the pair of bus bars 3 and the recessed portions 34 and the lower edges 35 of the bus bars 3 are positioned inside the case.

Next, the pair of terminal-equipped electric wires 8 are assembled to the connector 1. First, the other end portions of the pair of terminal-equipped electric wires 8 (end portions on a side opposite to the one end portions to which the terminal fittings 42 are connected) are respectively connected to devices (for example, an oil pump or the like, not shown) disposed inside the case. The other end portions of the pair of terminal-equipped electric wires 8 may be connected to the device before the connector 1 is assembled to the outer wall 60 of the case.

Next, the flat plate portions 43 of the terminal fittings 42 of the pair of terminal-equipped electric wires 8 are fastened and fixed to the fastened portions 31 of the pair of bus bars 3, respectively. Here, when a work of fastening and fixing the terminal fittings 42 (flat plate portions 43) of the terminal-equipped electric wires 8 extending from the devices disposed inside the case to the pair of fastened portions 31 positioned inside the case is performed, since the internal space of the case is limited, the electric wires 41 of the terminal-attached electric wires 8 may need to be largely curved (that is, the electric wires 41 may be bent with a small radius of curvature). In particular, when the devices are positioned near the pair of fastened portions 31, this need is increased. In this case, since the work is performed in the narrow internal space of the case while resisting the elastic force generated by the curved electric wires 41, it is difficult to improve workability of the operation. In particular, when an electric wire having a large diameter (so-called thick electric wire) is used as the electric wire 41, or when a degree of curvature of the electric wire 41 is large, the elastic force generated by the electric wire 41 is also large, which makes the work more difficult.

Figure 7A:
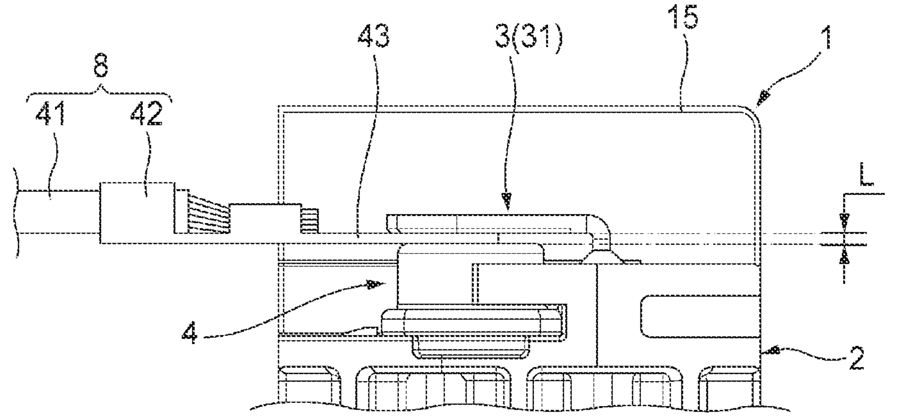
FIGS. 7A to 7C are views showing, in time series, a procedure for assembling a terminal fitting of a terminal-equipped electric wire to the connector shown in FIG. 1.

Regarding to this point, in the present example, first, as shown in FIG. 6C, the flat plate portion 43 of one terminal fitting 42 of the pair of terminal fittings 42 is brought closer to the upper fastened portion 31 from the right side while the pair of electric wires 41 extending from the device are curved. Then, as shown in FIG. 7A, the flat plate portion 43 is inserted into the gap L between the upper fastened portion 31 and the nut 4. Similarly, the flat plate portion 43 of the other terminal fitting 42 of the pair of terminal fittings 42 is brought close to the lower fastened portion 31 the left side (see FIG. 6C), and is inserted into the gap L between the lower fastened portion 31 and the nut 4.

As described above, when the flat plate portion 43 of each of the terminal fittings 42 is inserted into the gap L between the fastened portion 31 and the nut 4, the flat plate portion 43 is pressed against the fastened portion 31 or the nut 4 by the elastic force generated by the electric wire 41, and the flat plate portion 43 (that is, the terminal fitting 42) can be held in the gap L by the frictional force. In other words, before the terminal fitting 42 is fastened to the fastened portion 31, the terminal fitting 42 can be temporarily fixed (temporarily placed) in the gap L between the fastened portion 31 and the nut 4. Accordingly, an operator can use the bolt 50, a fastening tool, or the like used for fastening by releasing his or her hand from the electric wire 41 or the terminal fitting 42. Therefore, it is not necessary for the operator to perform bolt fastening or the like while pressing the terminal-equipped electric wire 8, and thus the bolt fastening work is facilitated. Further, when the terminal fitting 42 is temporarily fixed in this way, the flat plate portion 43 can be held in the gap L between the fastened portion 31 and the nut 4 even if the bolt through hole 43*a* (see FIG. 6C) of the flat plate portion 43 is not necessarily aligned with the bolt through hole 31*a* (see FIG. 6C) of the fastened portion 31 and the female screw portion of the nut 4. Therefore, the workability of the work of connecting the terminal-equipped electric wire 8 to the connector 1 can be further improved.

Figure 7B:
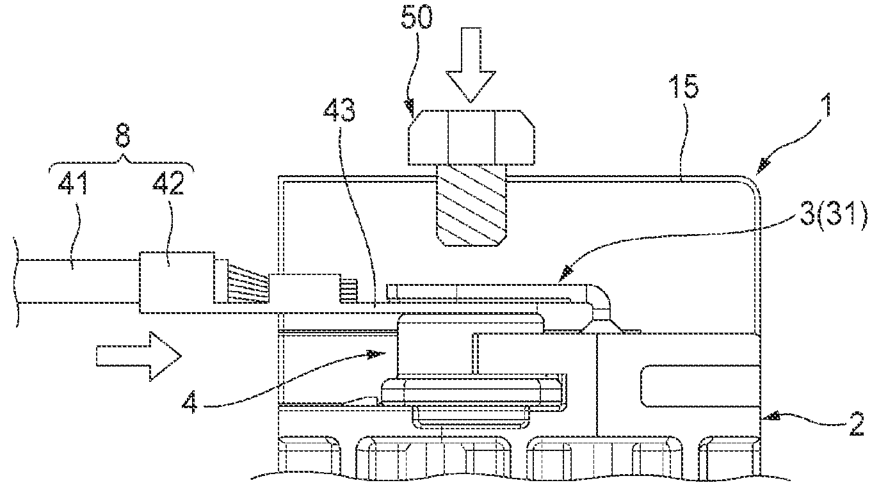
Figure 7C:
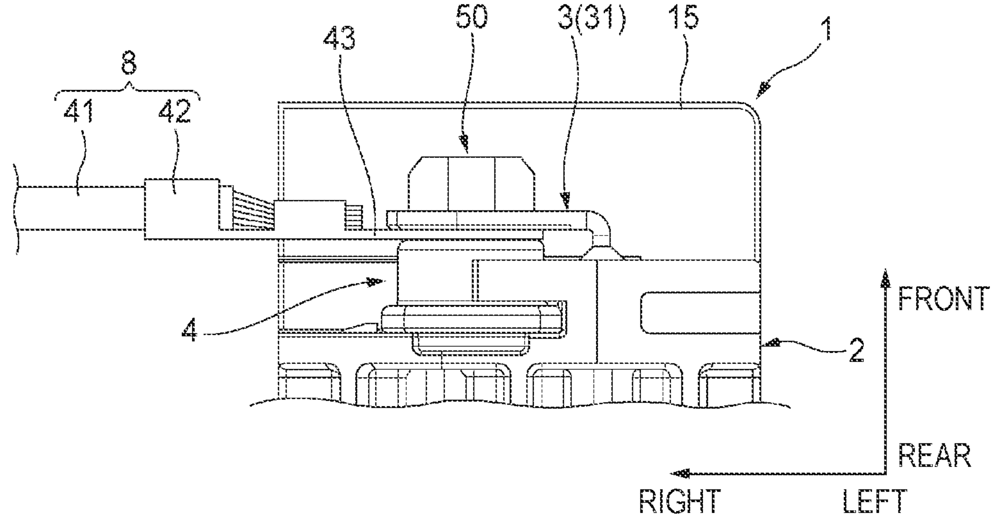

Then, from a state in which the pair of terminal fittings 42 are temporarily fixed, the bolt through hole 43*a* of the flat plate portion 43 is aligned with respect to the upper fastened portion 31, and then, as shown in FIG. 7B, the bolt 50 is inserted in an order of the bolt through hole 31*a* and the bolt through hole 43*a* from the upper side, and screwed into the female screw portion of the nut 4 positioned on the lower side of the flat plate portion 43, whereby the flat plate portion 43 (that is, the terminal fitting 42) and the upper fastened portion 31 are fastened together (see FIG. 7C). Similarly, the bolt through hole 43*a* of the flat plate portion 43 is aligned with respect to the lower fastened portion 31, and then the bolt 50 is inserted in an order of the bolt through hole 31*a* and the bolt through hole 43*a* from the lower side, and screwed into the female screw portion of the nut 4 positioned on the upper side of the flat plate portion 43, whereby the flat plate portion 43 (that is, the terminal fitting 42) and the lower fastened portion 31 are fastened together. Thus, the assembly of the pair of terminal-equipped electric wires 8 to the connector 1 is completed.

Figure 8:
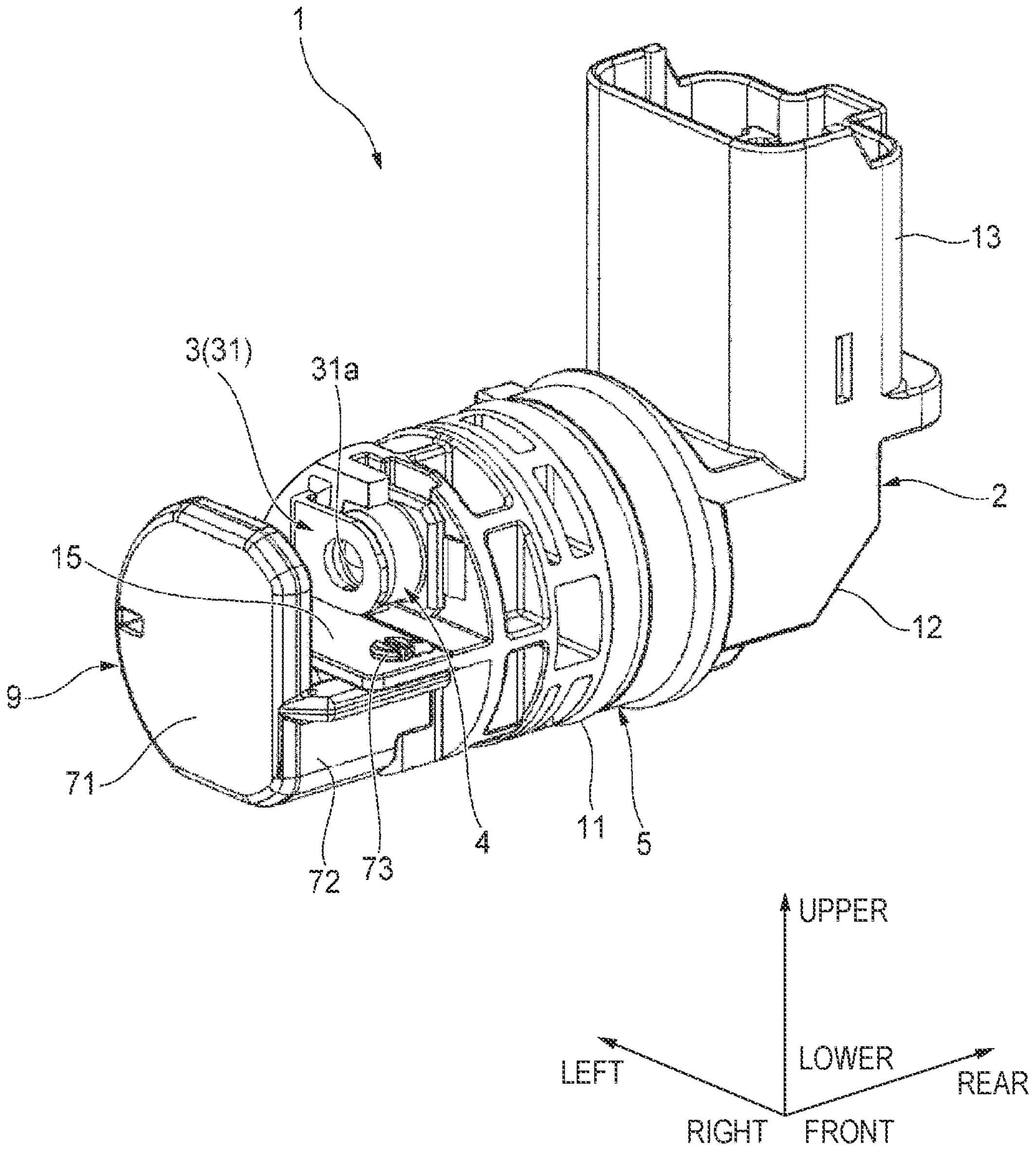
FIG. 8 is a perspective view showing a connector according to a modification.

In the example shown in FIG. 1, the pair of fastened portions 31 and the pair of nuts 4 positioned on the front end surface of the main body portion 11 are exposed to the outside. In contrast, as shown in FIG. 8, a cover 9 that covers the pair of fastened portions 31 and the pair of nuts 4 may be provided. Accordingly, the peripheral components can be prevented from unintentionally coming into contact with the fastened portions 31 or the like when the connector 1 is assembled to the case or the like. Further, as will be described in detail later, by increasing a creepage distance between the pair of fastened portions 31, unintended conduction between the pair of bus bars 3 can be prevented.

Hereinafter, the cover 9 shown in FIG. 8 will be described. The cover 9 is made of transparent resin or the like, and is supported by the partition wall 15 of the main body portion 11 so as to be rotatable (openable and closable) between a closed position (see FIGS. 8 and 9A) at which the cover 9 covers the pair of fastened portions 31 and the pair of nuts 4 and an open position (see FIG. 9B) at which the cover 9 does not cover the pair of fastened portions 31 and the pair of nuts 4.

Figure 9A:
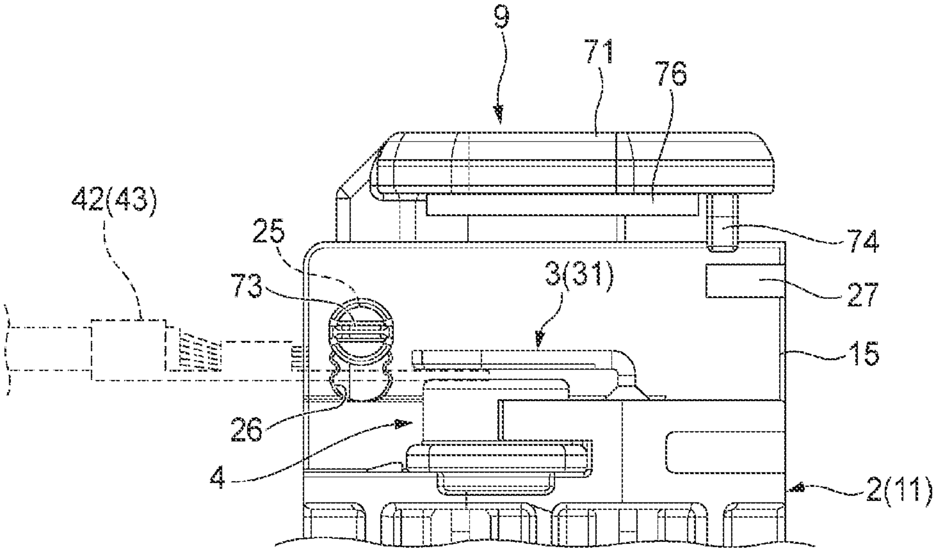
FIGS. 9A and 9B are views showing, in time series, a first half of a procedure for assembling a terminal fitting of a terminal-equipped electric wire to the connector shown in FIG. 8.

As shown in FIGS. 8, 9A, and the like, the cover 9 integrally includes a flat plate portion 71 extending in a direction orthogonal to the front-rear direction at the closed position, and an extending portion 72 extending rearward from a portion including a lower right corner portion of a peripheral edge of the flat plate portion 71 at the closed position. When viewed in the front-rear direction, the entire flat plate portion 71 at the closed position is positioned in the circular region inside the O-ring 5 mounted in the annular recessed portion 18 of the main body portion 11. Accordingly, when the main body portion 11 is inserted into the attachment hole 63, the flat plate portion 71 at the closed position is prevented from interfering with the peripheral edge or the like of the attachment hole 63. Further, when the O-ring 5 is externally inserted into the main body portion 11 from the front side of the main body portion 11 and is attached to the annular recessed portion 18, the cover 9 is less likely to become an obstacle.

The extending portion 72 is integrally provided with a rotating shaft portion 73 extending in the up-down direction. The rotation shaft portion 73 is selectively rotatably inserted into a temporary locking hole 25 and a full locking hole 26 that are provided in a right end portion of the partition wall 15 of the main body portion 11. The temporary locking hole 25 and the full locking hole 26 are disposed such that the temporary locking hole 25 is positioned in front of the full locking hole 26, and the temporary locking hole 25 and the full locking hole 26 are aligned in the front-rear direction. The temporary locking hole 25 and the full locking hole 26 communicate with each other in the front-rear direction via a narrow gap. Therefore, w % ben a rearward force is applied to the rotating shaft portion 73 (the cover 9 at the closed position) in a state in which the rotating shaft portion 73 is rotatably inserted into the temporary locking hole 25, the rotating shaft portion 73 moves from the temporary locking hole 25 to the full locking hole 26, and the rotating shaft portion 73 can be shifted to a state in which the rotating shaft portion 73 is rotatably inserted into the full locking hole 26.

A locking portion 74 is provided on a rear surface of a left end portion of the flat plate portion 71 at the closed position. The locking portion 74 can be locked to a locked portion 27 provided at a left end portion of the partition wall 15 in a state in which the cover 9 is at the closed position and the rotating shaft portion 73 is inserted into the full locking hole 26.

Figure 11A:
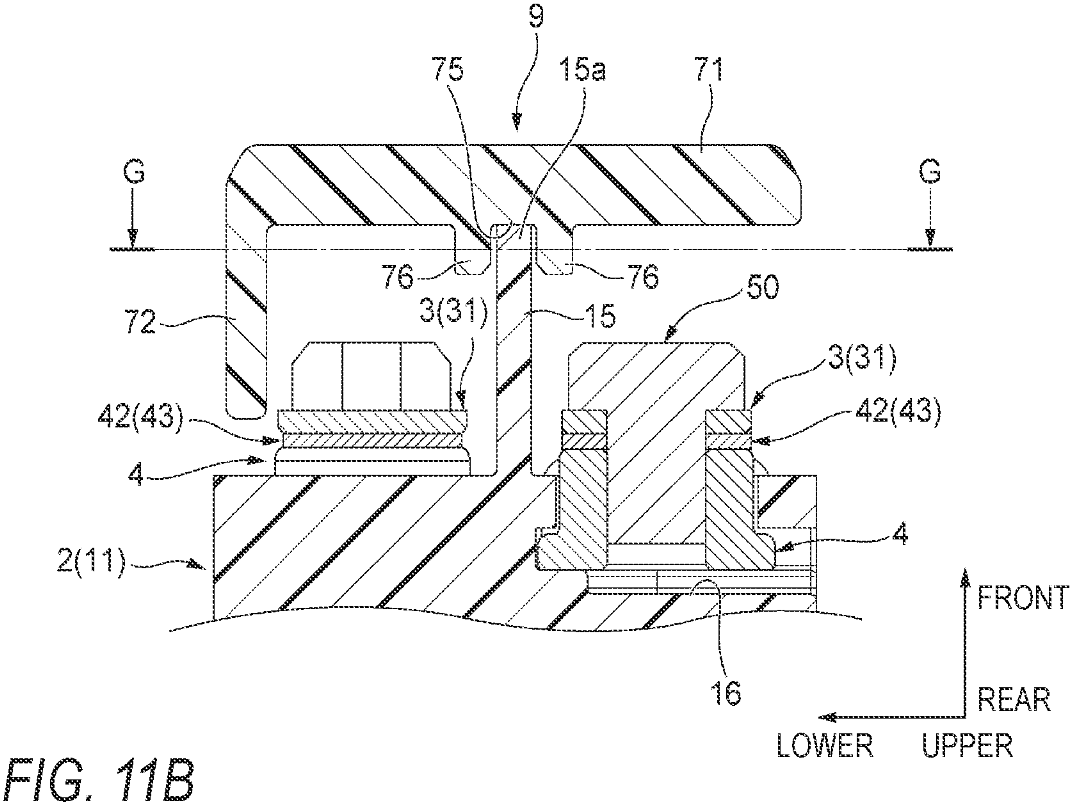
FIG. 11A is a cross-sectional view taken along a line F-F of FIG. 10B.
Figure 11B:
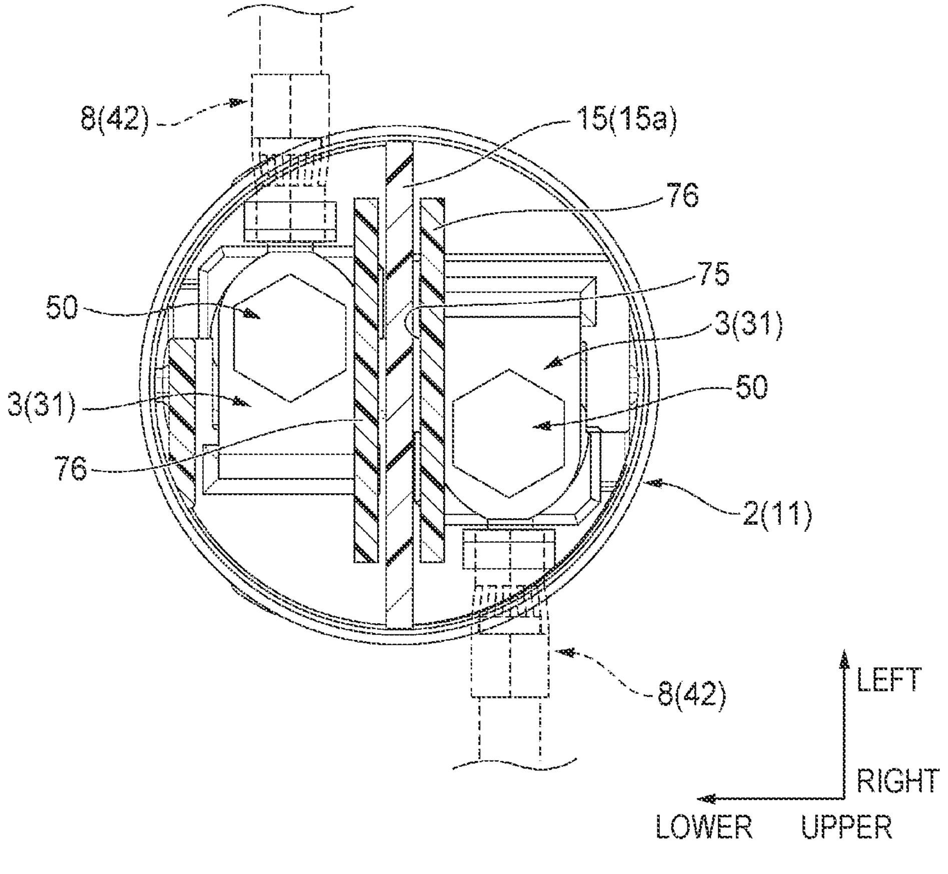
FIG. 11B is a cross-sectional view taken along a line G-G of FIG. 11A.

The flat plate portion 71 is formed with a pair of ribs 76 extending in the left-right direction at an interval in the up-down direction on a rear surface of a central portion of the flat plate portion 71 in the up-down direction at the closed position (see FIGS. 11A and 11B). Accordingly, a recessed portion 75 defined by the pair of ribs 76 is formed so as to extend in the left-right direction. In the state in which the cover 9 is at the closed position and the rotation shaft portion 73 is inserted into the full locking hole 26, a protruding end portion (protruding portion) **15*a* extending in the left-right direction of the partition wall 15 is inserted into the recessed portion 75 (see FIGS. 11A and 11B). Accordingly, the protruding portion 15*a* and the recessed portion 75 mesh with each other at a position sandwiched between the pair of fastened portions 31, thereby obtaining a structure (so-called labyrinth structure) in which an entry path of the oil to pass through the partition wall 15 is lengthened. As a result, the unintended conduction between the pair of bus bars 3** can be more reliably prevented.

In the example shown in FIG. 8, when the connector 1 is assembled to the outer wall 60 of the case, the main body portion 11 is inserted into the attachment hole 63 of the outer wall 60 of the case in the state in which the cover 9 is at the closed position and the rotating shaft portion 73 is inserted into the temporary locking hole 25. Accordingly, the peripheral components can be prevented from unintentionally coming into contact with the fastened portions 31 and the nuts 4.

Figure 9B:
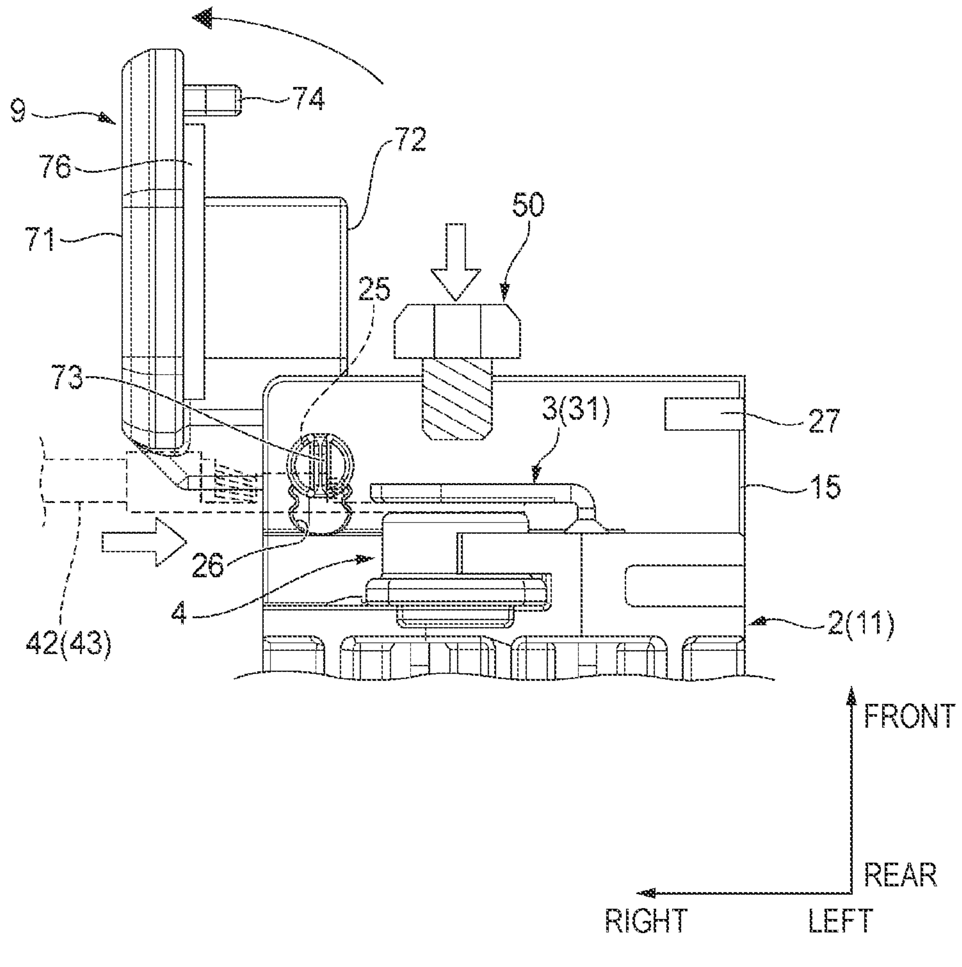

After the assembling of the connector 1 to the outer wall 60 of the case is completed, as shown in FIG. 9A, the flat plate portion 43 of the terminal fitting 42 is inserted into the gap L between the fastened portion 31 and the nut 4 and is temporarily fixed while maintaining the state in which the cover 9 is at the closed position and the rotating shaft portion 73 is inserted into the temporary locking hole 25. Next, as shown in FIG. 9B, the fastened portion 31 and the flat plate portion 43 are fastened together by the bolt 50 in a state in which the cover 9 is opened and held at the open position while maintaining the state in which the rotating shaft portion 73 is inserted into the temporary locking hole 25. Here, a reason why the cover 9 is opened is that the flat plate portion 71 covers the fastened portion 31 in a state in which the cover 9 is closed, and the flat plate portion 71 becomes an obstacle.

Figure 10A:
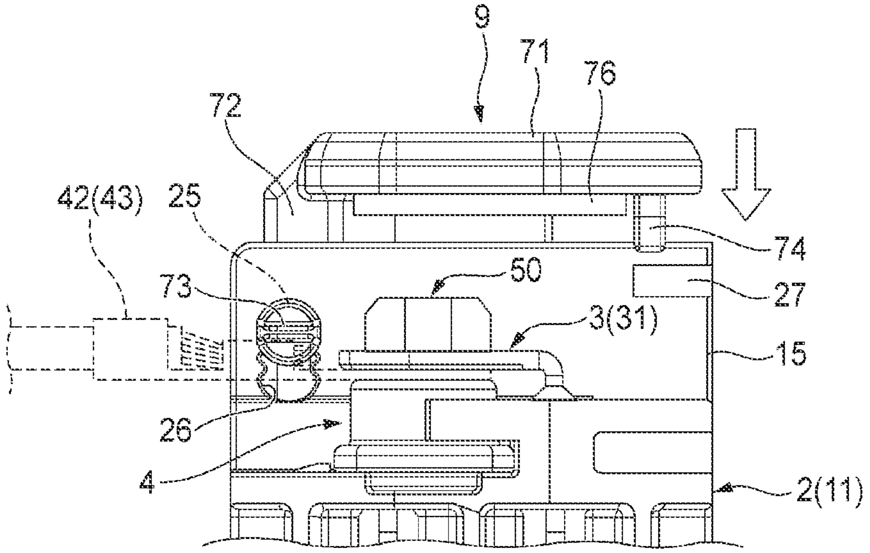
FIGS. 10A and 10B are views showing, in time series, a latter half of the procedure for assembling the terminal fitting of a terminal-equipped electric wire to the connector shown in FIG. 8.
Figure 10B:
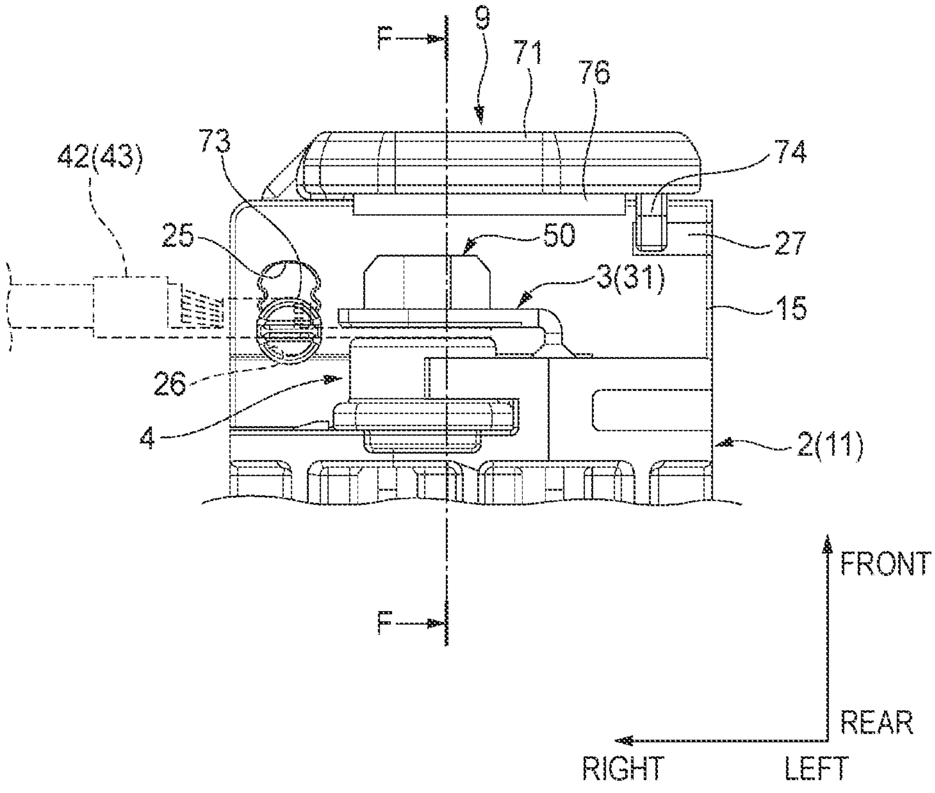

After the completion of the co-fastening work by the bolt 50, as shown in FIG. 10A, the cover 9 is closed again while maintaining the state in which the rotating shaft portion 73 is inserted into the temporary locking hole 25. Then, a rearward force is applied to the cover 9 (the flat plate portion 71). Accordingly, as shown in FIG. 10B, the rotating shaft portion 73 moves from the temporary locking hole 25 to the full locking hole 26, the locking portion 74 of the cover 9 is locked to the locked portion 27 of the partition wall 15, and the protruding portion **15*a* of the partition wall 15 is inserted into the recessed portion 75 of the cover 9, thereby forming the labyrinth structure described above. Accordingly, the work of assembling the terminal-equipped electric wires 8 to the connector 1** is completed.

In a state in which the work of assembling the terminal-equipped electric wires 8 to the connector 1 is completed, the locking portion 74 of the cover 9 is locked to the locked portion 27 of the partition wall 15, whereby the cover 9 is prevented from being unintentionally opened. Further, since the labyrinth structure described above is obtained, the unintended conduction between the pair of bus bars 3 can be reliably prevented.

Figure 12:
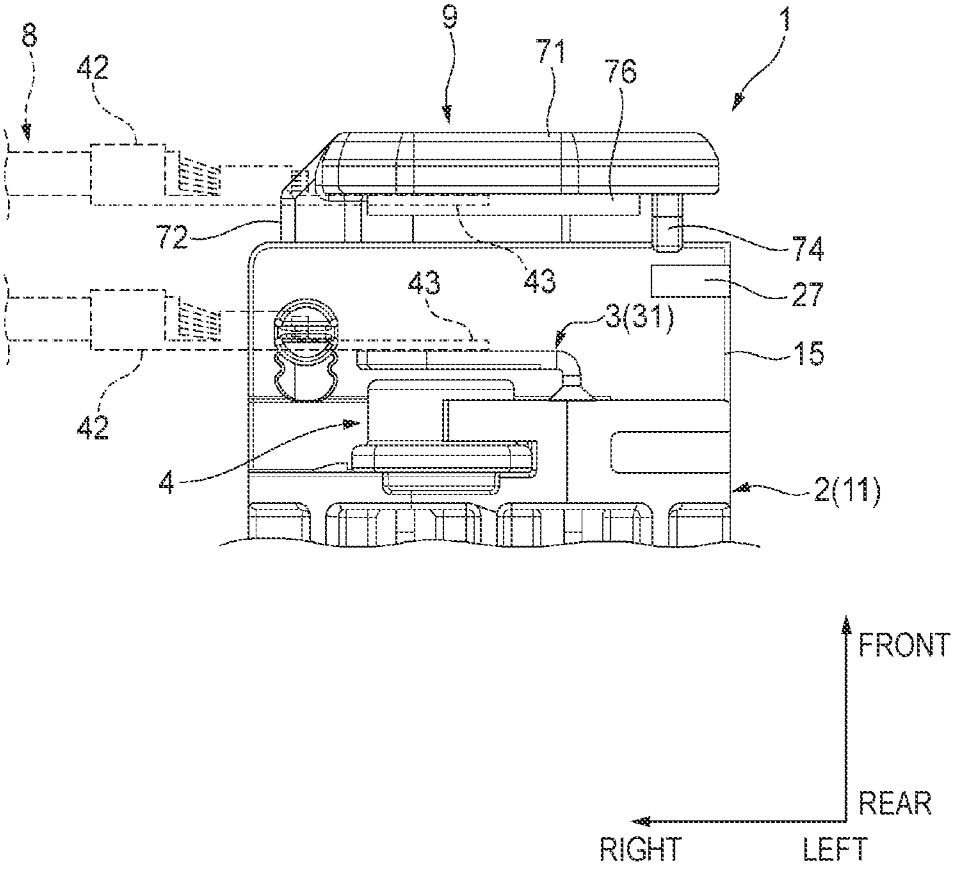
FIG. 12 is a diagram corresponding to FIG. 9A according to another modification.

In the example shown in FIG. 9A, the flat plate portion 43 of the terminal fitting 42 is inserted into the gap L between the fastened portion 31 and the nut 4 and is temporarily fixed in a state in which the cover 9 is at the closed position and the rotating shaft portion 73 is inserted into the temporary locking hole 25. Meanwhile, as shown in FIG. 12, the flat plate portion 43 of the terminal fitting 42 may be inserted into a gap between the fastened portion 31 and the flat plate portion 71 of the cover 9 and is temporarily fixed in the state in which the cover 9 is at the closed position and the rotating shaft portion 73 is inserted into the temporary locking hole 25. In this case, when the flat plate portion 43 is inserted into the gap between the fastened portion 31 and the flat plate portion 71, the flat plate portion 43 is pressed against the fastened portion 31 or the flat plate portion 71 by the elastic force generated by the electric wire 41, and the flat plate portion 43 (that is, the terminal fitting 42) can be held in the gap by the frictional force. Further, when the terminal fitting 42 is temporarily fixed in this way, the flat plate portion 43 can be held in the gap between the fastened portion 31 and the flat plate portion 71 even if the bolt through hole **43*a* of the flat plate portion 43 is not necessarily aligned with the bolt through hole 31*a* of the fastened portion 31 and the female screw portion of the nut 4. Therefore, the workability of the work of connecting the terminal-equipped electric wire 8 to the connector 1 can be further improved. In this way, when the flat plate portion 43 (that is, the terminal fitting 42) is temporarily fixed to the gap between the fastened portion 31 and the flat plate portion 71, as in the above-described embodiment, the flat plate portion 43 is then inserted into the gap L between the fastened portion 31 and the nut 4, and the fastened portion 31 and the flat plate portion 43 are fastened together by the bolt 50**.

Functions and Effects

As described above, according to the connector 1 of the present embodiment, when the bus bars 3 are insert-molded in the housing 2, by engaging the recessed portions 34 (that is, the exposed portions) of the bus bars 3 with the inner surface of the molding die, even when the bus bars 3 receive the flow pressure of the molten resin flowing in the die, the positional deviation of the bus bars 3 can be made less likely to occur. Accordingly, the positional accuracy of the bus bars 3 in the housing 2 can be improved. Further, since the recessed portions 34 of the bus bars 3 are disposed on the inner side of the case with respect to the outer wall 60, as compared to a case where the recessed portions 34 are exposed to the outside of the case, since the inside of the case is isolated from the external environment by the outer wall 60, it is possible to prevent foreign matters such as water from entering the boundary between the recessed portions 34 and the housing 2. That is, the recessed portions 34 do not have a particular adverse effect on sealing performance of the case and the like. As described above, the connector 1 of the present configuration can improve the positional accuracy of the bus bars 3 in the housing 2 without excessively impairing original performances (for example, sealing performance of the case is not impaired) of the connector 1 attached to the outer wall 60 of the case.

Further, the recessed portions 34 of the bus bars 3 are exposed in the grooves 17 of the housing 2. Since the thickness of the housing 2 is reduced by the grooves 17, a variation in the dimension of the housing 2 itself due to the molding shrinkage of the resin can be reduced, and the positional accuracy of the bus bars 3 and the dimensional accuracy of the gaps L between the fastened portions 31 and the nuts 4 can be improved. Further, since the recessed portions 34 of the bus bars 3 are exposed in the grooves 17, peripheral components are prevented from being unintentionally caught by the recessed portions 34 when the connector 1 is used. Further, since the periphery of the recessed portions 34 is surrounded by groove inner walls of the grooves 17, even when a liquid such as lubricating oil is sealed inside like a transmission and conductive fine particles (for example, so-called contamination such as abrasion powder of a gear) is contained in the liquid, unintended conduction between the bus bars 3 and the peripheral conductive components can be prevented.

Further, the recessed portions 34 having a cutout shape is provided at the exposed portions of the bus bars 3. Accordingly, since the recessed portions 34 of the bus bars 3 and the inner surface of the molding die can be more firmly engaged with each other, the positional deviation of the bus bars 3 when the bus bars 3 receive the flow pressure of the molten resin flowing in the die can be further prevented from occurring.

Further, the potting materials 7 (seal members) that seal the boundaries between the bus bars 3 and the housing 2 are provided between the exposed portions 32 (contact portions) of the bus bars 3 outside the case and the recessed portions 34 of the body portions 36 of the bus bars 3. Therefore, since the recessed portions 34 of the bus bars 3 are not exposed to the outside of the case, the intrusion of the foreign matters from the outside can be prevented, and the intrusion of foreign matters from the outside through the boundaries can also be prevented by the potting materials 7. The potting materials 7 prevent the contents (for example, oil or the like) of the case from flowing out from the inside to the outside of the case.

Further, after the housing 2 is assembled to the outer wall 60 of the case, when the terminal fittings 42 are connected (that is, bolted) to the fastened portions 31 of the bus bars 3 while the electric wires 41 extending from the device or the like disposed inside the case are curved, when the terminal fittings 42 are inserted into the gaps L between the fastened portions 31 and the nuts 4, the terminal fittings 42 can be pressed against the fastened portions 31 or the nuts 4 by the elastic force generated by the electric wires 41, and the terminal fittings 42 can be held in the gaps L by the frictional force. In other words, before the terminal fittings 42 are fastened to the fastened portions 31, the terminal fittings 42 can be temporarily fixed (temporarily placed) in the gaps L between the fastened portions 31 and the nuts 4. Accordingly, the operator can use the bolts 50, the fastening tool, or the like by releasing his or her hand from the electric wires 41 or the terminal fittings 42. Therefore, it is not necessary for the operator to perform bolt fastening or the like while pressing the terminal-equipped electric wires 8, and thus the bolt fastening work is facilitated. In particular, in the connector 1, since the positional accuracy of the bus bars 3 is excellent, it is possible to prevent the dimension of the gaps L between the fastened portions 31 of the bus bars 3 and the nuts 4 from becoming excessively large or excessively small. Therefore, it is possible to prevent insufficient temporary fixing of the terminal fittings 42 described above, and weak co-fastening by the bolts 50 due to the gaps L being too large. Further, it is possible to prevent a situation in which it is difficult to temporarily fix the terminal fittings 42 to the gaps L due to the gap L being too small. Therefore, in the connector 1 according to the present embodiment, the workability of the work of connecting the terminal-equipped electric wires 8 to the connector 1 can be improved.

Other Embodiments

The present invention is not limited to the above-described embodiment, and various modifications can be used within the scope of the present invention. For example, the present invention is not limited to the above-described embodiment, and may be appropriately modified, improved or the like. In addition, respective configuration elements of the embodiments are arbitrary and not limited in view of a material, a shape, a dimension, a quantity, an arrangement location, or the like, so long as the present invention can be achieved.

In the above-described embodiment, the pair of bus bars 3 are insert-molded and held in the housing 2 of the connector 1. Meanwhile, one single bus bar 3 may be insert-molded and held in the housing 2 of the connector 1. In this case, the partition wall 15 of the connector 1 is unnecessary.

Further, in the above embodiment, the recessed portions 34 of the bus bars 3 are exposed in one of the plurality of grooves 17 formed in the body portion 11 of the housing 2. Meanwhile, the recessed portions 34 of the bus bars 3 may be exposed at a position at which the plurality of grooves 17 are not formed on the cylindrical outer peripheral surface of the body portion 11 of the housing 2. Further, as long as an engagement portion can be engaged with a protrusion or the like formed on an inner surface of the molding die, the engagement portion having a shape different from that of the recessed portions 34 may be provided at the exposed portions of the bus bars 3. For example, bending points formed by bending the bus bars 3 may be disposed at the exposed portions, and the bending points may be used as engagement portions with the protrusion or the like of the mold.

Further, in the above-described embodiment, the connector 1 is attached to the outer wall 60 of the case (box-shaped body) such as the transmission. Meanwhile, the connector 1 may be attached to a wall portion other than the outer wall of the case (box-shaped body). For example, when the inside and the outside of the case are separated by multiple wall portions, the connector 1 may be attached to any one of the wall portions.

Here, features of the embodiments of the connector 1 according to the present invention described above will be briefly summarized and listed in the following [1] to [5].

[1]

A connector (1) includes:

a resin housing (2) to be assembled to a wall portion (60) of a box-shaped body that is an attachment target; and a bus bar (3) including a body portion (36) insert-molded and held in the housing (2) and a fastened portion (31) that is disposed on an inner side of the box-shaped body with respect to the wall portion (60) and is to be connected to a terminal fitting (42) by fastening using a bolt (50), in which the body portion (36) of the bus bar (3) includes a portion at which an exposed portion (34) that is exposed to an outside of the housing (2) without being covered with a resin constituting the housing (2) is to be provided on an inner side of the box-shaped body with respect to the wall portion (60).

[2]

The connector (1) according to [1], in which the housing (2) has one or a plurality of grooves (17), and the exposed portion (34) of the bus bar (3) is disposed in a groove of the groove (17).

[3]

The connector (1) according to [1] or [2], in which the body portion (36) of the bus bar (3) has, in the exposed portion, a recessed portion (34) recessed such that the bus bars (3) is cut off.

[4]

The connector (1) according to any one of [1] to [3], in which the bus bar (3) includes a contact portion (32) that is disposed on an outer side of the box-shaped body with respect to the outer wall (60) and is to be connected to an external terminal, and the connector (1) further includes a seal member (7) that seals a boundary between the bus bar (3) and the housing (2) between the contact portion (32) and the exposed portion (34) of the body portion (36).

[5]

The connector (1) according to any one of [1] to [4], further comprising:

a nut (4) that is to be held by the housing (2) with a gap (L) between the nut and the fastened portion (31), the gap allowing insertion of the terminal fitting (42), and that engages with the bolt (50) to fasten the fastened portion (31) and the terminal fitting (42) inserted into the gap (L) together.

According to the connector having the configuration of [1], when the bus bars are insert-molded in the housing, by engaging the exposed portions of the bus bars with the inner surface of the molding die, even when the bus bars receive the flow pressure of the molten resin flowing in the die, the positional deviation of the bus bars can be made less likely to occur. Accordingly, the positional accuracy of the bus bars can be improved. Further, since the exposed portions of the bus bars are disposed on the inner side of the box-shaped body with respect to the wall portion, as compared to a case where the exposed portions are exposed to the outer side of the box-shaped body, since the inside of the box-shaped body is isolated from the external environment by the wall portion, it is possible to prevent the foreign matters such as water from entering the boundaries between the exposed portions of the bus bars and the housing. The foreign matters entered the boundary may be a factor that impairs the sealing performance of the box-shaped body, and thus it is desirable to reduce the foreign matters as much as possible. In the connector of this configuration, as described above, the exposed portions do not have a particular adverse effect on the sealing performance of the box-shaped body and the like. Therefore, the connector of the present configuration can improve the positional accuracy of the bus bars without excessively impairing original performances (for example, sealing performance of the box-shaped body is not impaired) of the connector attached to the wall portion of the box-shaped body.

According to the connector having the configuration of [2], the exposed portion of the bus bar is disposed in the groove of the groove of the housing. Since the thickness of the housing is reduced by the groove, a variation in the dimension of the housing itself due to the molding shrinkage of the resin can be reduced, and the positional accuracy of the bus bar can be improved. Further, since the exposed portion of the bus bar is disposed in the groove of the groove, the peripheral components are prevented from being unintentionally caught on the exposed portion when the connector is used. Further, since the periphery of the exposed portion is surrounded by the groove inner wall of the groove, even w % ben the liquid such as the lubricating oil is sealed inside like the transmission and the conductive fine particles (for example, so-called contamination such as abrasion powder of the gear) is contained in the liquid, the unintended conduction between the bus bar and the peripheral conductive components can be prevented.

According to the connector having the configuration of [3], the recessed portion having a cutout shape is provided at the exposed portion of the bus bar. Accordingly, since the exposed portion (recessed portion) of the bus bar and the inner surface of the molding die can be more firmly engaged with each other, the positional deviation of the bus bar when the bus bar receives the flow pressure of the molten resin flowing in the die can be further prevented from occurring.

According to the connector having the configuration of [4], the seal member that seals the boundary between the bus bar and the housing is provided between the contact portion of the bus bar outside the box-shaped body and the exposed portion of the body portion of the bus bar. Therefore, since the exposed portion of the bus bar is not exposed to the outside of the box-shaped body, the intrusion of the foreign matters from the outside can be prevented, and the intrusion of the foreign matters from the outside through the boundary can also be prevented by the seal member. The seal member prevents the contents (for example, oil or the like) of the box-shaped body from flowing out from the inside to the outside of the box-shaped body.

According to the connector having the configuration of [5], after the housing is assembled to the wall portion (for example, the outer wall) of the box-shaped body, for example, when the terminal fitting is connected to the fastened portion of the bus bar (that is, co-fastening by the bolt and the nut is performed) while the electric wire extending from the device or the like disposed inside the box-shaped body is curved, if the terminal fitting is inserted into the gap between the fastened portion and the nut, the terminal fitting can be pressed against the fastened portion or the nut by the elastic force generated by the electric wire, and the terminal fitting can be held in the gap. In other words, before the terminal fitting is fastened and fixed to the fastened portion, the terminal fitting can be temporarily fixed (temporarily placed) in the gap between the fastened portion and the nut. Accordingly, for example, when the terminal fitting is fastened and fixed, the operator can release his or her hand from the electric wire or the terminal fitting to prepare a bolt, a fastening tool, or the like. Therefore, for example, even when the terminal fitting of the electric wire is fixed to the bus bar of the connector while the electric wire extending from the device is largely curved (that is, in a state where the electric wire is bent with a small radius of curvature) due to a reason that the internal space of the box-shaped body is narrow or the like, it is not necessary for the operator to always press the terminal-equipped electric wire, and thus the work of fastening and fixing the terminal fitting is easy. In particular, in the connector of the present configuration, since the positional accuracy of the bus bars is excellent, it is possible to prevent the dimension of the gaps between the fastened portions of the bus bars and the nuts from becoming excessively large or excessively small. Therefore, it is possible to prevent insufficient temporary fixing of the terminal fittings and a weak fastening force caused by the bolts due to the gaps being too large. Further, it is possible to prevent a situation in which it is difficult to temporarily fix the terminal fittings to the gaps due to the gaps being too small.

According to the present invention, a connector excellent in positional accuracy of a bus bar can be provided.

What is claimed is:

1. A connector for mounting on a box-shaped body, the box-shaped body including a wall portion and a terminal fitting on an inner side with respect to the wall portion, the connector comprising:

a resin housing configured to be assembled to the wall portion of the box-shaped body; and a bus bar including a body portion insert-molded and held in the housing and a fastened portion that is configured to be disposed on the inner side of the box-shaped body with respect to the wall portion when the resin housing is assembled to the wall portion, and the bus bar is configured to be connected to the terminal fitting by fastening using a bolt when the resin housing is assembled to the wall portion, wherein the body portion of the bus bar includes an exposed portion that is exposed to an outside of the housing without being covered with a resin constituting the housing, the exposed portion is configured to be provided on the inner side of the box-shaped body with respect to the wall portion when the resin housing is assembled to the wall portion.

2. The connector according to claim 1, wherein the housing has one or a plurality of grooves, and the exposed portion of the bus bar is disposed in the groove.

3. The connector according to claim 1, wherein the body portion of the bus bar has, in the exposed portion, a recessed portion recessed such that the bus bar is cut off.

4. The connector according to claim 1, wherein the bus bar includes a contact portion that is disposed on an outer side of the box-shaped body with respect to the wall portion and is configured to be connected to an external terminal that is on the outer side of the box-shaped body when the resin housing is assembled to the wall portion, and the connector further includes a seal member that seals a boundary between the bus bar and the housing between the contact portion and the exposed portion of the body portion.

5. The connector according to claim 1, further comprising:

a nut that is to be held by the housing with a gap between the nut and the fastened portion, the gap allowing insertion of the terminal fitting, and that engages with the bolt to fasten the fastened portion and the terminal fitting inserted into the gap together.

6. The connector according to claim 1, wherein the bus bar includes a through hole and the resin constituting the housing fills the through hole.

* * * * *